US012442240B2

(12) United States Patent
Garry et al.

(10) Patent No.: US 12,442,240 B2
(45) Date of Patent: Oct. 14, 2025

(54) BIFOLD DOOR

(71) Applicants: Matthew Garry, Weatherford, TX (US); Gregory Oliver Valler, Toowoomba (AU)

(72) Inventors: Matthew Garry, Weatherford, TX (US); Gregory Oliver Valler, Toowoomba (AU)

(73) Assignee: Matthew John Garry, Hillsboro, TX (US)

(*) Notice: Subject to any disclaimer, the term of this patent is extended or adjusted under 35 U.S.C. 154(b) by 229 days.

(21) Appl. No.: 18/210,008

(22) Filed: Jun. 14, 2023

(65) Prior Publication Data

US 2023/0407697 A1 Dec. 21, 2023

Related U.S. Application Data

(60) Provisional application No. 63/352,534, filed on Jun. 15, 2022.

(51) Int. Cl.
*E05F 15/665* (2015.01)
*E05D 15/26* (2006.01)
*E05F 15/605* (2015.01)

(52) U.S. Cl.
CPC .......... *E05F 15/665* (2015.01); *E05D 15/264* (2013.01); *E05F 15/605* (2015.01); *E05Y 2900/132* (2013.01)

(58) Field of Classification Search
CPC ....... E05F 15/665; E05F 15/605; E05F 15/60; E05F 15/264; E05F 15/51; E05F 15/53
See application file for complete search history.

(56) References Cited

U.S. PATENT DOCUMENTS 3,718,171 A * 2/1973 Godwin ................ B64C 1/1415 244/129.5
5,056,847 A * 10/1991 Stillwell .................. B60J 5/125 296/50
9,593,525 B1 * 3/2017 Morris .................. E05D 15/262
2016/0273225 A1 9/2016 Giglio
2017/0074019 A1 * 3/2017 Schweiss .................. E05C 1/06

FOREIGN PATENT DOCUMENTS

DE 3513630 C1 8/1986

OTHER PUBLICATIONS

International Search Report and Written Opinion of the International Searching Authority in related International Application No. PCT/US2023/025458 mailed Oct. 11, 2023 (13 pages).

* cited by examiner

*Primary Examiner* — Beth A Stephan
(74) *Attorney, Agent, or Firm* — Lathrop GPM LLP

(57) ABSTRACT

A bifold door includes an upper panel including a top edge disposed proximate an anchor and a lower edge disposed distal of the anchor. The upper hinge, connecting the anchor to the top edge, permits rotation of the top edge of the upper panel but prevents elevation of the top edge of the upper panel. A first actuator, connected to the anchor and the upper panel, lifts the lower edge of the upper panel upwardly and outwardly, and effects lifting of the upper panel. A lower panel, separated from the upper panel, includes an upper edge disposed proximate the lower edge and a bottom edge disposed distal of the lower edge. A second actuator, connected to the upper panel and to the lower panel, lifts the upper edge of the lower panel upwardly and outwardly, and to effect lifting of the lower panel.

19 Claims, 21 Drawing Sheets

BIFOLD DOOR

CROSS-REFERENCE TO RELATED APPLICATIONS

This application claims priority to U.S. Provisional Patent Application 63/352,534, filed Jun. 15, 2022, the entirety of which is hereby incorporated by reference.

BACKGROUND

A hangar or other building may use a bi-fold door to protect the entrance to the hangar or other building. Bifold doors may be subject to various failure conditions.

SUMMARY

The one or more embodiments provide for a bifold door. The bifold door includes an upper panel including a top edge disposed proximate an anchor and a lower edge disposed distal of the anchor relative to the top edge. The bifold door also includes an upper hinge connecting the anchor to the top edge of the upper panel. The upper hinge is configured to permit rotation of the top edge of the upper panel but prevent elevation of the top edge of the upper panel, relative to gravity. The bifold door also includes a first actuator connected to the anchor and to the upper panel. The first actuator is configured to lift the lower edge of the upper panel upwardly relative to a direction of gravity and outwardly relative to the anchor. The first actuator is further configured to effect lifting of the upper panel. The bifold door also includes a lower panel, separated from the upper panel, the lower panel including an upper edge disposed proximate the lower edge of the upper panel, and a bottom edge disposed distal of the lower edge of the upper panel. The bifold door also includes a second actuator connected to the upper panel and to the lower panel The second actuator is configured to lift the upper edge of the lower panel upwardly relative to the direction of gravity and outwardly relative to the anchor. The second actuator is further configured to effect lifting of the lower panel.

The one or more embodiments also provide for a method of manufacturing a bifold door. The method includes connecting a first actuator connected to an upper panel of the bifold door. The first actuator further includes a connection point configured to connect to an anchor. The method also includes connecting a second actuator to the upper panel and to a lower panel of the bifold door. The first actuator is configured to rotate the upper panel. The second actuator is configured to rotate the lower panel. The first actuator and the second actuator are disposed in a plane intersecting the bifold door. The first actuator and the second actuator are configured to be actuated in tandem.

The one or more embodiments also provide for another method. The method includes connecting an upper panel to an anchor. The upper panel includes a top edge disposed proximate the anchor and a lower edge disposed distal of the anchor relative to the top edge. The method also includes connecting an upper hinge to the anchor and to the top edge of the upper panel. The upper hinge is configured to permit rotation of the top edge of the upper panel but prevent elevation of the top edge of the upper panel, relative to gravity. The method also includes connecting a first actuator to the anchor and to the upper panel. The first actuator is configured to lift the lower edge of the upper panel upwardly relative to a direction of gravity and outwardly relative to the anchor. The method also includes connecting a second actuator to the upper panel and to a lower panel. The second actuator is configured to rotate the lower panel.

Other aspects of the one or more embodiments will be apparent from the following description and the appended claims.

LIST OF COMPONENTS

Figure 1:
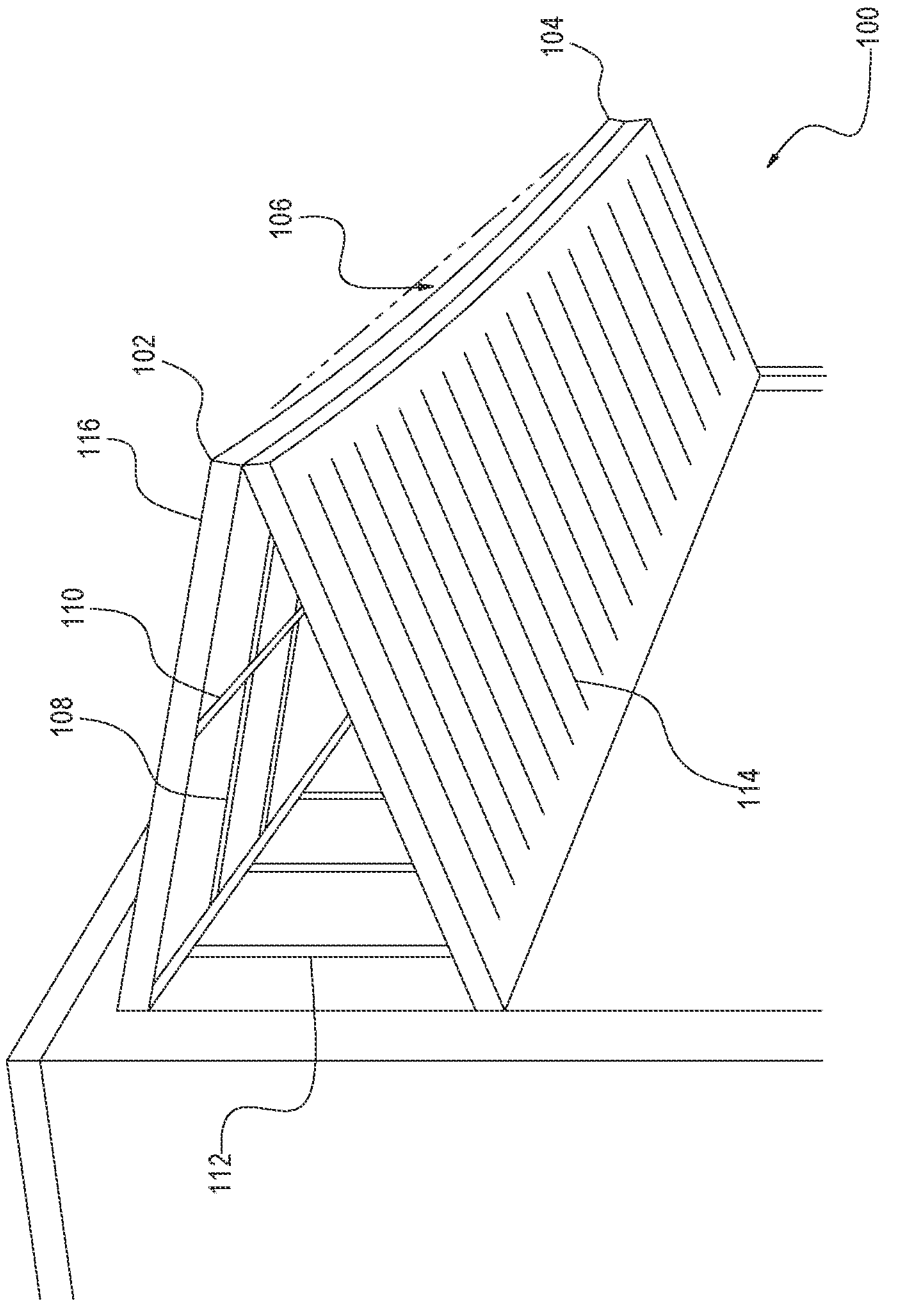
FIG. 1 shows a bifold door in a failure condition.

The following is a list of components described in the one or more embodiments and shown in the figures.

bifold door (200)
the first actuator (202)
second actuator (204)
anchor (206)
upper panel (208)
vertical reinforcing beam (212)
siding (214)
upper hinge (216)
top edge (210)
anchor hinge (220)
lower hinge (224)
lower panel (222)
claw hinge (226)
lower edge (218)
upper edge (228)
bottom edge (230)
rail (232)
joist (234)
second rail (236)
clevis portion (1204)
mechanical stop (1208)
mechanical stop (1210)
outer lip (1212)
outer lip (1214)
hinge mount (1216)
second end (1220)
second vertical reinforcing beam (1222)
crank mechanism (1224)
common joint (1226)
seal (1300)
second hinge mount (1500)
rotatable hinge portion (1502)
proximal end (1504)
distal end (1506)
bottom bracket portion (1508A)
guide roller (238)
first vertical end (240)
lower portion (242)
second vertical end (244)
vertical reinforcing member (246)
horizontal reinforcing member (248)
space (250)
angle (600) between the upper panel and the lower panel
sweep line (900) (path of lower edge of upper door)
sweep line (902) (path of lower edge of lower door)
sweep line (1000) (path of lower edge of upper door)
sweep line (1002) (path of lower edge of lower door)
outer joint hinge (1200)
inner joint hinge (1202)
top bracket portion (1508B)
integrated hinge portion (1510)
second integrated hinge portion (1512)
mounting plate (1514)
upper plate (1700)
lower plate (1702)
first outer bifold door (1800)
second outer bifold door (1802)
central bifold door (1804)
specific hangar (1806)
upper rails (1900)
first folding track (2000)
second folding track (2002)
joint portion (2004)

DETAILED DESCRIPTION

Bifold doors may be subject to various failure conditions, such as, but not limited to, bowing or bending along the length of the bifold door between the lateral outside edges of the bifold door. In general, the one or more embodiments address this engineering problem using a series of dual actuators to ensure proper support and reinforcement along the length of the bifold door.

The bifold door of the one or more embodiments may use vertical beams with actuators on the vertical beam to control door panel deflection along a horizontal length of some of the door panel edges. Lateral beams of the one or more embodiments may span between the vertical beams and thus may not span the door width. As a result, with the one or more embodiments, lighter door frames are possible, as lower stiffness is used to achieve low panel deflections. Using the one or more embodiments there is no need for lateral trusses commonly seen on tilt and bifold doors.

The lower mass and high wind load capability of the one or more embodiments is useful for bifold doors having wide spans (over about fifty feet). Additionally, the lower suspended mass reduces loads on the building frames, which may be particularly useful for large span buildings (such as hangar doors for passenger jets).

Note that sliding doors may transfer load directly to the ground, thereby reducing suspended load requirements. However, sliding doors may use space on the sides, which is not always available. Bifold doors have lower moment reactions than tilt doors, and actuators sit inside the bifold doors to protect the actuators from the elements.

Control of actuator displacement in relation to the upper and lower actuators has been proven useful by calculation to reduce loads on optional guide rollers. The guide rollers may become unnecessary and retained as a redundant load carrying mechanism to allow for unforeseen loads and mechanical failure of door elements. Without such control, there may be significant differences in actuator force and deflections, if relying on the guide rolls and door stiffness to control actuator displacement.

In an embodiment, electric screw jacks may be used as actuators, with coupling shafts across the bifold door to keep actuator displacement equal. This arrangement may avoid the cost of hydraulic actuators with expensive servo controls.

A control system may be used to regulate the non-linear relationship between upper and lower actuators. This arrangement may allow the lower lip of the bifold door and the guide rollers to move vertically. This control is also useful for a multi-door system, as guide rolls may not carry the expected reaction forces.

The bifold door movement, as shown in the figures described below, may be a solution to bifold door failure. With the one or more embodiments, the interior of the building may be unaffected, and outside movement of the bifold door of the one or more embodiments may be less than outside movement of tilt doors.

FIG. 1 shows a bifold door (100) in a failure condition. The bifold door (100) is bowed or bending along the length of the bifold door (100) between point (102) and point (104). The bowing is more apparent in the center of the bifold door (100), as shown at point (106). Note that the bowing in the bifold door (100) occurred despite the presence of structural supports (108) and structural supports (110) shown on the backside of the bifold door (100).

The bowing failure shown at point (106) may occur due to the self-weight of the door panels. For example, bowing may occur even when the draw wire (112) used to draw the bottom panel (114) of the bifold door (100) towards the top panel (116) of the bifold door (100) adequately supports the weight of the central regions of the bottom panel (114) and the top panel (116).

The mid hinge line sags down, as shown at point (106) when the bifold door (100) is up, as the support reactions come from the guide rollers at the outer edges. The door panels are very stiff in plane, or there is movement of the lower edge of the low panel back into the building. This fact allows the mid hinge edge to roll down. The door panels thus benefit from in-plane stiffness (sheeting, X-braces) and out of plane stiffness (lateral beams). As the deflection increases, the loads on the door and rollers increase. The compounding loading effect can lead to failure, as shown at point (106), at a much lower load than otherwise expected.

The one or more embodiments address this type of mechanical failures in bifold doors. Briefly, the one or more embodiments use a series of actuators that act in tandem to lift a bifold door, but without additional strain applied to the central region of the bifold door.

FIG. 2, FIG. 3, FIG. 4, FIG. 5, FIG. 6, FIG. 7, FIG. 8A, FIG. 8B, and FIG. 8C show line drawings of different views of a bifold door (200). FIG. 2 through FIG. 8C refer to different views of one example of the one or more embodiments. Therefore, reference numerals in common between FIG. 2 through FIG. 8C refer to common objects having common descriptions and common functions.

Figure 2:
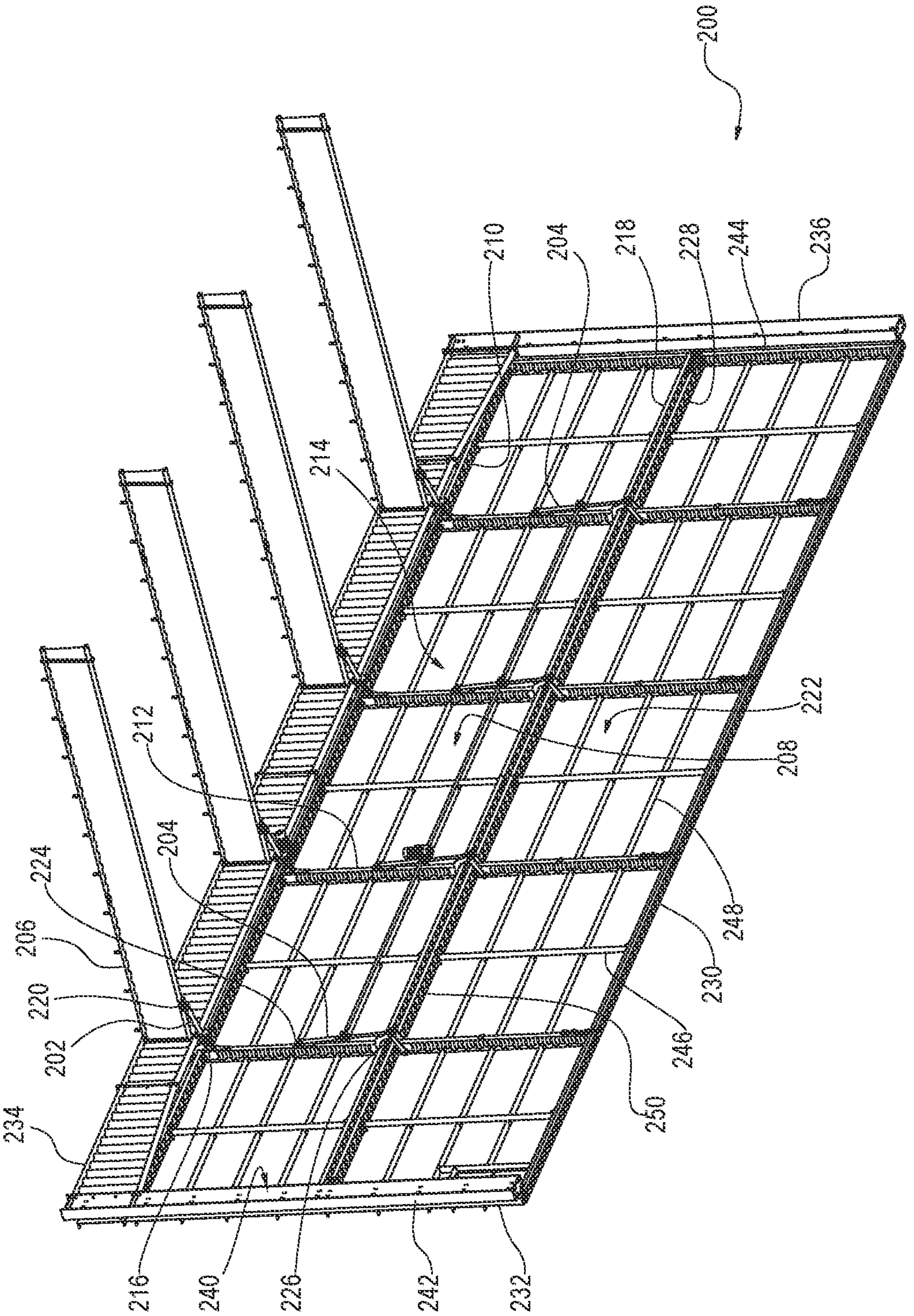
FIG. 2, FIG. 3, FIG. 4, FIG. 5, FIG. 6, FIG. 7, FIG. 8A, FIG. 8B, and FIG. 8C show line drawings of different views of a bifold door having a series of dual hydraulic actuators, in accordance with one or more embodiments.

Referring to FIG. 2, the bifold door (200) is opened using a series of dual hydraulic actuators, as described below, in accordance with one or more embodiments. In summary, the series of dual actuators support and act on the top portion and bottom portions of the bifold door. At least one pair of actuators is used per door, though potentially many pairs of actuators may be used.

Each pairs of actuators may be characterized as a first actuator (202) and a second actuator (204). The terms "first" and "second" are nonce terms that are used to distinguish different components in the one or more embodiments. Thus, for example, the first actuator (202) may be characterized as a "second" actuator in some embodiments. Similarly, the second actuator (204) may be characterized as a "first" actuator in some embodiments. Thus, in the one or more embodiments, the terms first and second may be interchanged without affecting the descriptions, functions, and connection points of the dual actuators described herein.

The first actuator (202) is connected to an anchor (206). As used herein, the anchor (206) is a physical object which is immovable, or may be configured to be immovable, relative to the bifold door (200). In the example of FIG. 2, the anchor (206) is a support beam for supporting a roof of the building, but could also be characterized as a joist, rafter, or doors support.

The first actuator (202) is also connected to an upper panel (208) of the bifold door. The first actuator (202) may be connected to a top edge (210) of the upper panel (208) of the bifold door (200). In other embodiments, the first actuator (202) may be connected to some other portion of the upper panel (208) of the bifold door (200), such as along a vertical reinforcing beam (212) or to siding (214) that forms the outer panel of the upper panel (208) of the bifold door (200).

The first actuator (202) is configured to exert a force while lengthening along a longitudinal length of the first actuator (202). In other words, the first actuator (202) applies a pressure against the anchor (206), which does not move. The upper panel (208) of the bifold door (200), being movable, begins to push outwardly relative to the anchor (206).

However, because the upper panel (208) of the bifold door (200) is rotatably connected to the first actuator (202) via an upper hinge (216), the top edge (210) of the upper panel (208) begins to rotate. Similarly, the first actuator (202) is connected to the anchor (206) via an anchor hinge (220). As a result, the lower edge (218) of the upper panel (208) of the bifold door (200) will both lift upwardly and move outwardly, as shown in FIG. 4 through FIG. 7. The angle formed between the upper hinge (216) and the first actuator (202), as well as the angle formed between the anchor hinge (220) and the first actuator (202), changes as the first actuator (202) extends longitudinally. However, in another embodiment, the first actuator (202) may rotate in order to effect rotation of the upper panel.

As a result, and the upper panel (208) lifts upwardly, relative to gravity, and outwardly, relative to the anchor (206). More specifically, the top edge (210) rotates while remaining vertically fixed relative to the anchor (206). However, the lower edge (218) moves vertically upwardly relative to gravity, and also swings outwardly in a clockwise direction, relative to the anchor (206).

Figure 12:
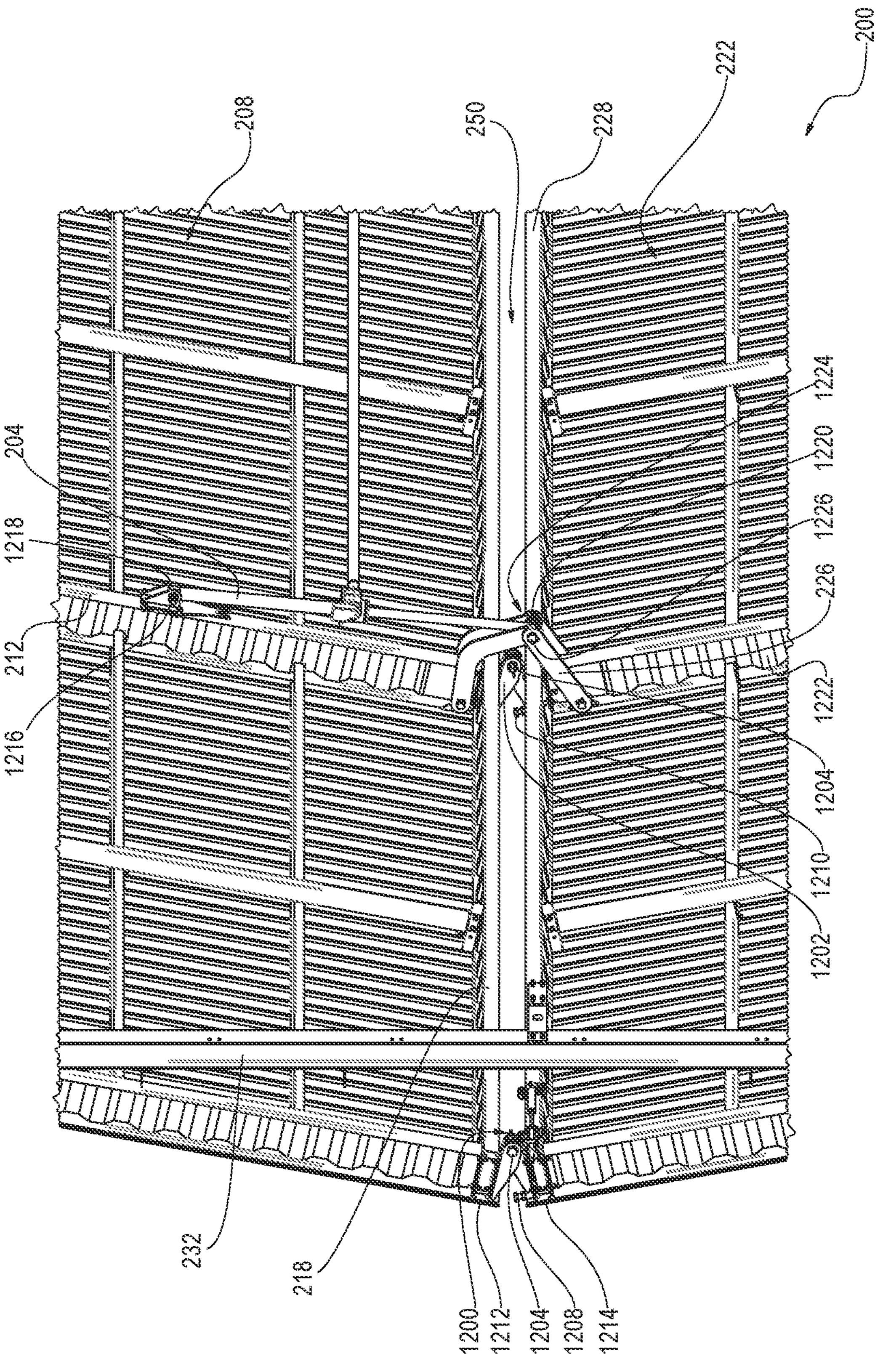
FIG. 12, FIG. 13, FIG. 14, FIG. 15, FIG. 16, and FIG. 17 show schematic details of the bifold door of FIG. 2 through FIG. 8C, in accordance with one or more embodiments.

The second actuator (204) is connected to the upper panel (208) of the bifold door (200) and to a lower panel (222) of the bifold door (200). In an embodiment, the second actuator (204) is specifically connected to a vertical reinforcing beam (212) of the upper panel (208) of the bifold door (200) via a lower hinge (224). (Again, the terms "upper" and "lower," as in the upper hinge (216) and the lower hinge (224), are nonce terms to identify different components arranged as shown in the figures.) In this embodiment, the second actuator (204) is connected to the lower panel (222) of the upper panel (208) via a claw hinge (226). The details of the claw hinge (226) are shown in FIG. 12, though briefly, the claw hinge (226) also is connected to the lower edge (218) of the upper panel (208), and also to the upper edge (228) of the lower panel (222).

Unlike the first actuator (202), the second actuator (204) is configured to apply a force by contracting along the longitudinal length of the second actuator (204). Thus, when the second actuator (204) is actuated, the second actuator (204) contracts, thereby pulling against both the upper panel (208) (at the lower edge (218)) and the lower panel (222) (at the upper edge (228)).

As a result, the lower panel (222) rotates in an opposite direction, relative to the upper panel (208), as the lower panel (222) is lifted upwardly relative to gravity. More specifically, the upper edge (228) of the lower panel (222) lifts upwardly relatively to gravity and swings outwardly in a counterclockwise direction, relative to the anchor (206). Concurrently, a bottom edge (230) of the lower panel (222) moves upwardly, relative to gravity.

In an embodiment, the movement of the second actuator (204) may be about 175°, which is past what can be achieved with a single linear actuator. Hence, a bell crank mechanism (similar to an excavator bucket) may be used with the second actuator (204). However, a rotary actuator or rack gear also may be used.

In an embodiment, the second actuator may be a positive displacement actuator. A positive displacement actuator may have a benefit in that the positive displacement actuator may permit a door with locks to carry static wind loads in a closed position. In this manner, the door with locks is configured to take wind loads in vertical members, rather than transferring such loads to side rails of the bifold door.

Figure 8C:
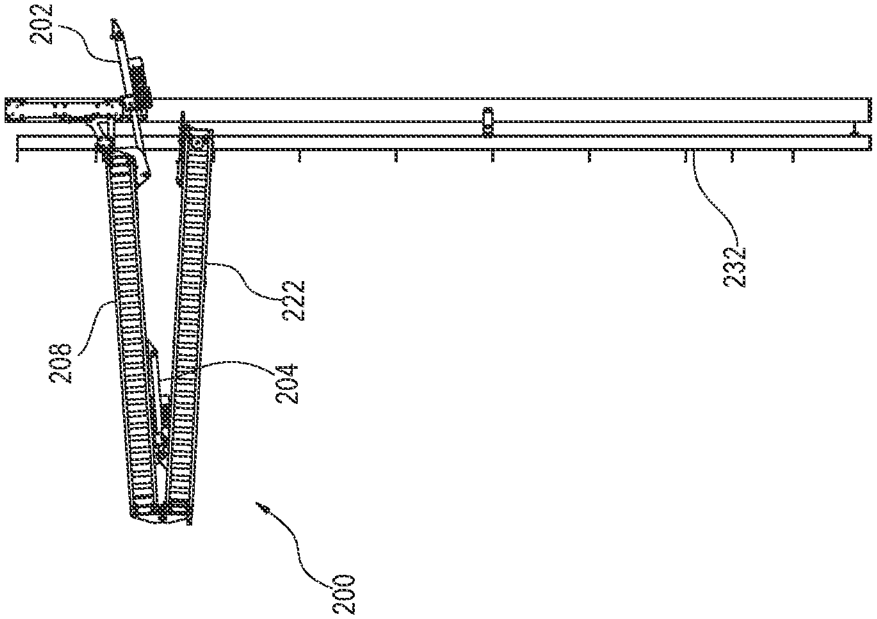
Figure 8B:
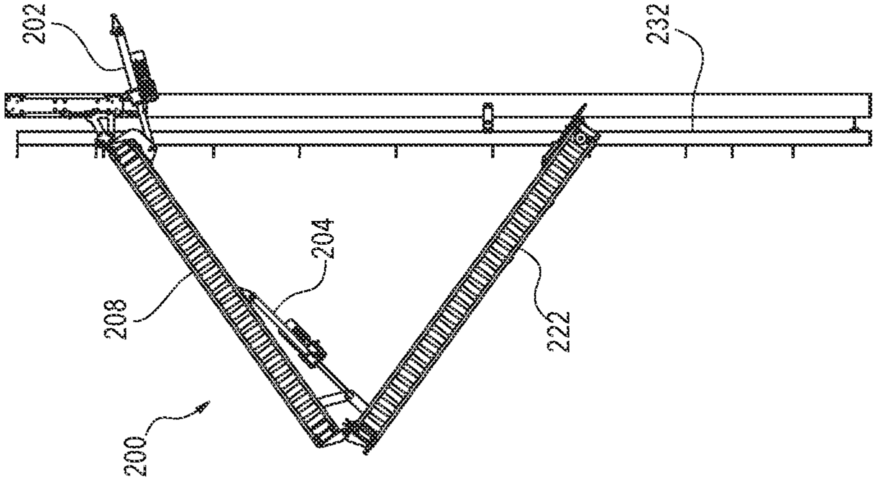
Figure 8A:
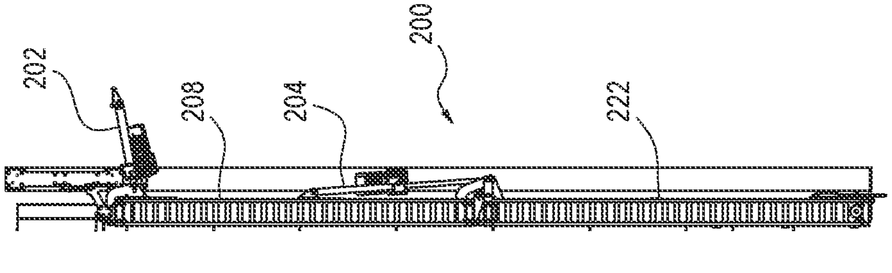
Figure 9:
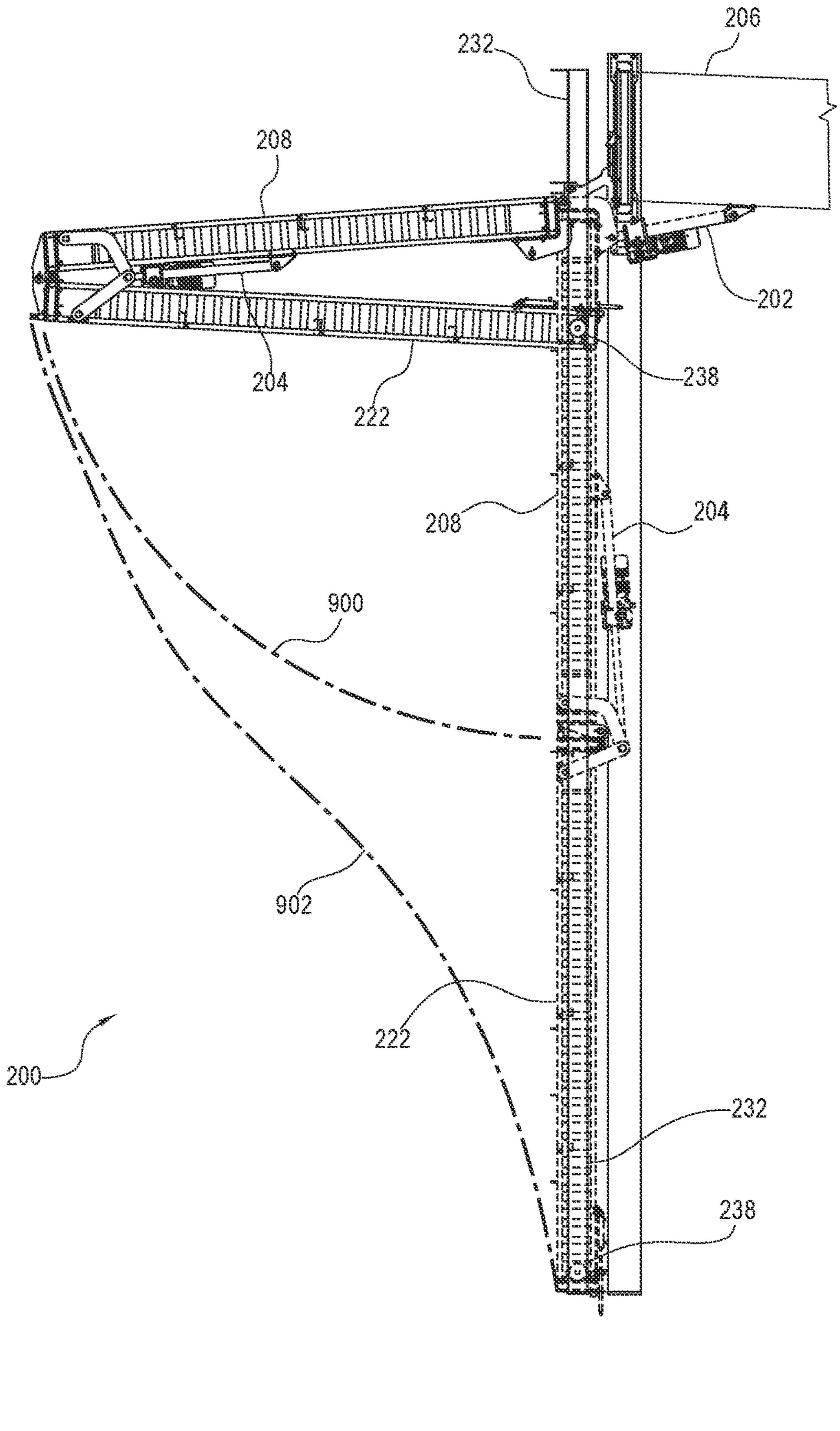
FIG. 9, FIG. 10, and FIG. 11 show schematics of the bifold door of FIG. 2 through FIG. 8C, in use, in accordance with one or more embodiments.

The concurrent motion of both the upper panel (208) and the lower panel (222) of the bifold door (200) is shown in FIG. 8A through FIG. 9. The relative positions of the first actuator (202) and the second actuator (204) when the bifold door (200) is both opened and closed are shown in FIG. 9.

In the above embodiments, it was assumed that the bifold door (200) was to be opened. When the bifold door (200) is to be closed, then the actions of the first actuator (202) and the second actuator (204) reverse. In other words, when the bifold door (200) is closed, the first actuator (202) is configured to contract and the second actuator (204) is configured to expand. As a result, the upper panel (208) and the lower panel (222) move in opposite directions, relative to those given above. (In other words, when the bifold door (200) is closed, the upper panel (208) rotates in a counterclockwise direction, and the lower panel (222) rotates in a clockwise direction).

The first actuator (202) and the second actuator (204) are activated in tandem and push or pull concurrently. Accordingly, the first actuator (202) and the second actuator (204) collectively may be referred to as a pair of actuators. When the pair of actuators is actuated, the bifold door will either lift (as the pair of actuators push and pull on the bifold door panels) or lower (as the pair of actuators pull and push on the bifold door panels). The bifold door slides along rail (232) and second rail (236). The action of the actuators, and additional positions of the bifold door, are further shown in FIG. 3 through FIG. 8C.

While the examples given above only described one pair of actuators, for the sake of clear explanation, the one or more embodiments contemplate that it will be commonplace for two or more pairs of actuators to be present for any given bifold door. In the embodiment shown in FIG. 2, four pairs of actuators (four first actuators and four second actuators) are present, as shown. More or fewer actuators may be present.

The first actuator (202) and the second actuator (204) may be a variety of different types of actuators. For example, the pair of actuators may be hydraulic actuators, electrical actuators, or other types of actuators. In an embodiment, types of hydraulic actuators may be mixed. For example, the first actuator (202) may be an electric actuator, and the second actuator (204) may be a hydraulic actuator. Still other variations are possible.

The bifold door (200) may include additional features. For example, optionally, a rail (232) may be connected to a building (e.g., a hangar, warehouse door, etc.). The rail (232) may be connected to the anchor (206) or to some other component of the building, such as but not limited to a joist (234), a frame element of the building (not shown), or combinations thereof. The rail (232) is vertically disposed, relative to gravity, adjacent the bifold door (200).

Optionally, a second rail (236) may be disposed opposite the rail (232). The second rail (236) also may be connected to the anchor (206), the joist (234), the frame element of the building (not shown), or combinations thereof. The second rail (236) need not be connected to the same supports as the rail (232).

Figure 10:
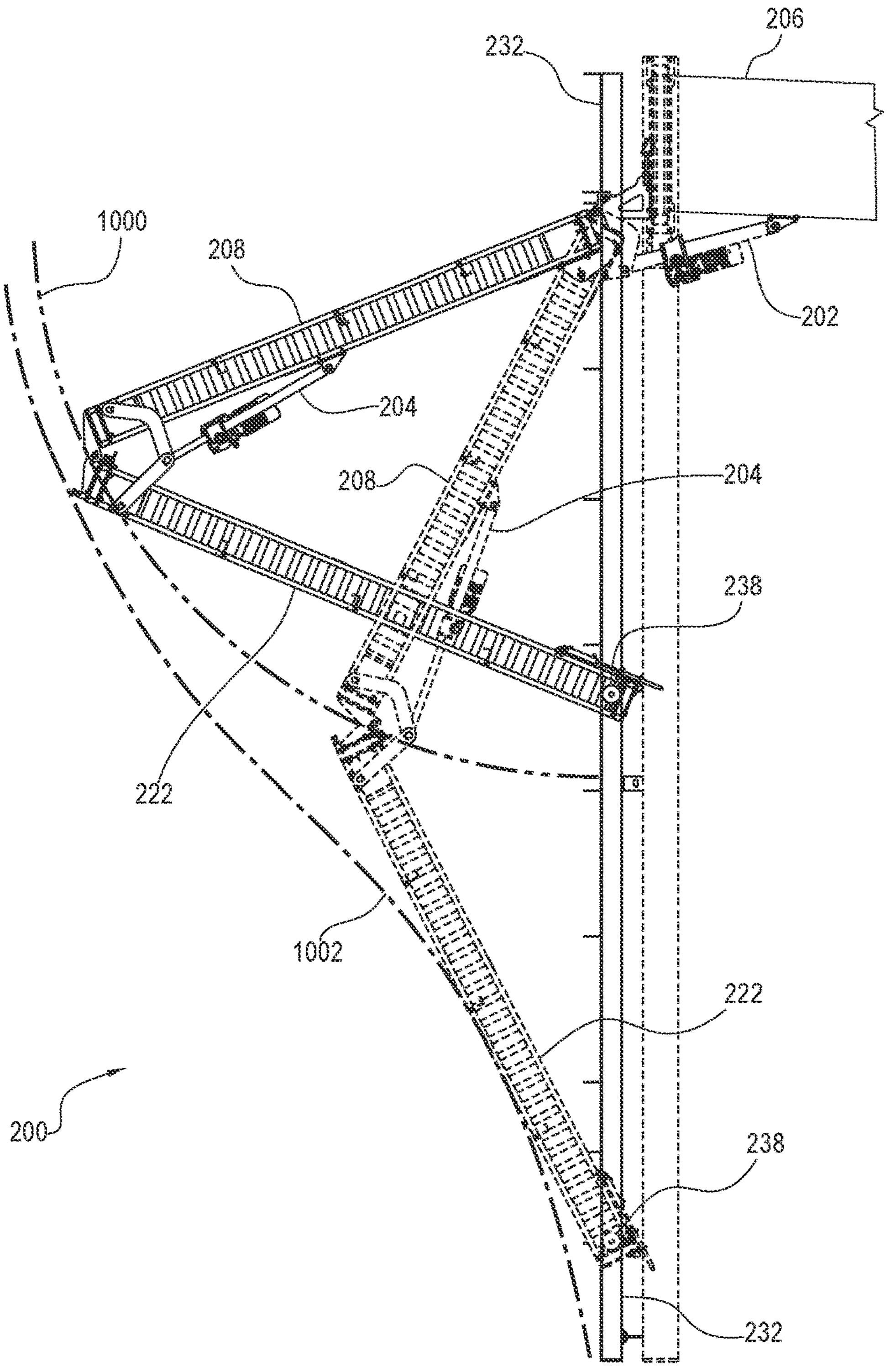
Figure 13:
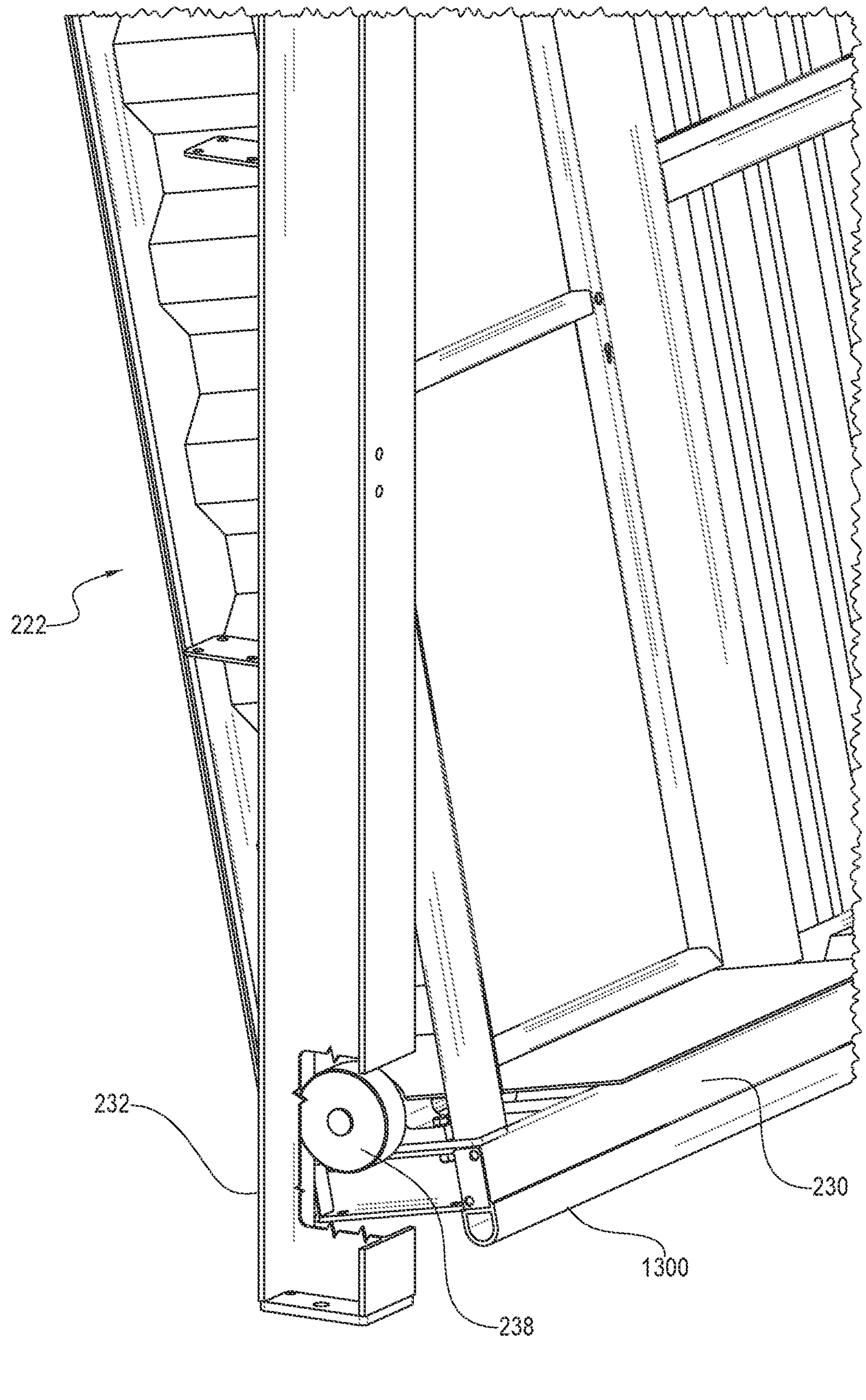

One or both of the upper panel (208) and the lower panel (222) may be connected to one or more guide rollers, such as the guide roller (238) shown in FIG. 10 and in FIG. 13. The one or more guide rollers may be disposed within one or both of the rails. In use, the guide rollers roll within the rails as the bifold door (200) opens and closes, helping to keep the top edge (210) of the upper panel (208) and the bottom edge (230) of the lower panel (222) vertically aligned with each other relative to the direction of gravity and relative to the anchor (206).

In an embodiment, the guide roller (238) is connected directly to a first vertical end (240) of a lower portion (242)

of the lower panel (222). A second guide roller (not shown) may be connected directly to a second vertical end (244) of the lower portion (242) of the lower panel (222). The guide roller (238) and the second guide roller may be disposed symmetrically, such as at equal heights along the first vertical end (240) and the second vertical end (244), relative to the bottom edge (230) of the lower panel (222). Thus, the guide roller (238) may be configured to roll within a rail (232) vertically disposed, relative to a direction of gravity, adjacent the bifold door (200).

However, guide rollers may also be placed at the vertical ends of the upper panel (208). Two or more guide rollers may be present at each of the vertical ends of either, or both, of the upper panel (208) and the lower panel (222). Other variations are possible.

The bifold door (200) may include still additional features. For example, vertical reinforcing members, such as vertical reinforcing member (246), and horizontal reinforcing members, such as horizontal reinforcing member (248) may be connected to one or both of the upper panel (208) and the lower panel (222).

The terms “vertical” and “horizontal” are referenced with respect to the direction of gravity but are nonce terms to aid in clearly distinguishing the grid pattern of reinforcing members shown in FIG. 2. If the bifold door (200) were turned ninety degrees (so that the bottom edge (230) became vertically disposed), then the vertical and horizontal reinforcing members would change names (i.e., the vertical reinforcing member (246) would instead be termed a “horizontal” reinforcing member), but the arrangement of the reinforcing members would not change relative to the bifold door (200).

The grid pattern of the reinforcing members shown in FIG. 2 may be varied. More or fewer reinforcing members may be present. The reinforcing members may be arranged in different orientations or patterns. For example, a pair of reinforcing members arranged in an “X” shape may be connected to the corners of the vertical reinforcing member (246) and the horizontal reinforcing member (248). Still other arrangements are possible.

The reinforcing members may reinforce the structural integrity of the bifold door (200). The reinforcing members also may aid in securing outer panels, or skins, which cover the reinforcing members and the vertical reinforcing beams. The panels may prevent rain, wind, particulates, objects, vehicles, and living organisms from passing through the bifold door (200), when the bifold door (200) is closed.

The bifold door (200) may include various arrangement of the features described above. For example, the upper panel (208) and the lower panel (222) may be arranged such that a space (250) is defined between the upper panel (208) and the lower panel (222). In this example, the upper panel (208) is secured to the lower panel (222) only via the claw hinge (226) and any other claw hinges that may be connected to the bifold door (200). Optionally, a cover panel (not shown) or an extension of either the upper panel (208) or the lower panel (222) may cover the space (250).

However, in another embodiment, the upper panel (208) and the lower panel (222) may be connected via a joint. The joint may take the form of one or more hinges that rotate as the upper panel (208) and the lower panel (222) rotate when the bifold door (200) is opened and closed. Still other variations are possible.

The bifold door (200) may be provided with yet other features. For example, one or more stops, such as stop (1210) shown in FIG. 14, may be connected to one or both of the lower edge (218) of the upper panel (208) and the upper edge (228) of the lower panel (222).

Figure 14:
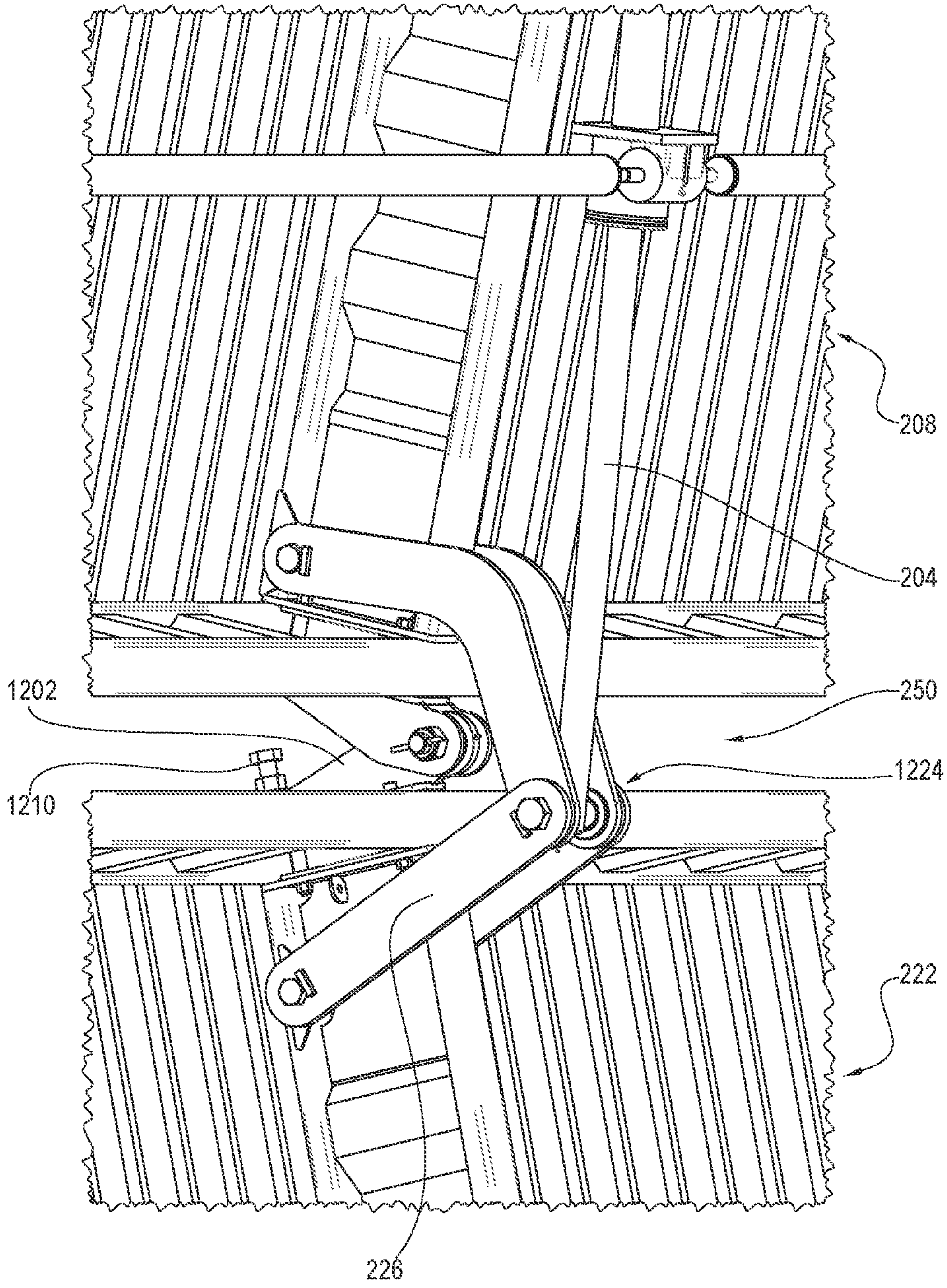
Figure 16:
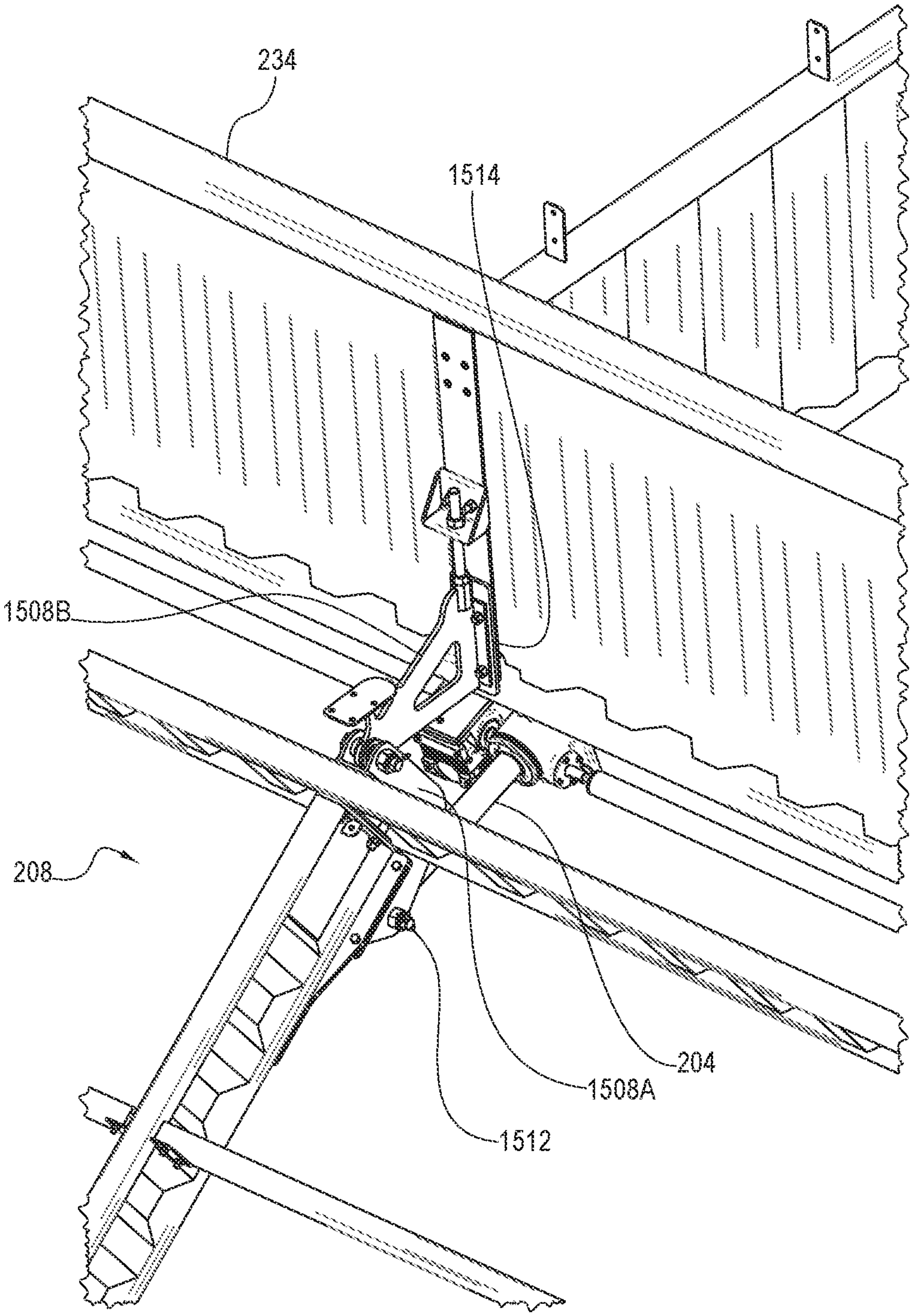

In another example, one or more additional mount hinges, such as inner joint hinge (1202) shown in FIG. 14 and FIG. 16), may be connected to the lower edge (218) of the upper panel (208) and the upper edge (228) of the lower panel (222). The mount hinges may aid in bearing the loads incurred by the bifold door (200) during opening and closing.

In still another example, the bifold door (200) may be provided with one or more seals, such as seal (1300) shown in FIG. 13. A seal also may be provided between the space (250), or along the top edge (210) of the upper panel (208).

Yet additional variations are possible, as shown in FIG. 3 through FIG. 20D. Thus, the examples provided above do not necessarily limit other variations or features of the bifold door (200), and do not necessarily limit the scope of the claims.

Figure 3:
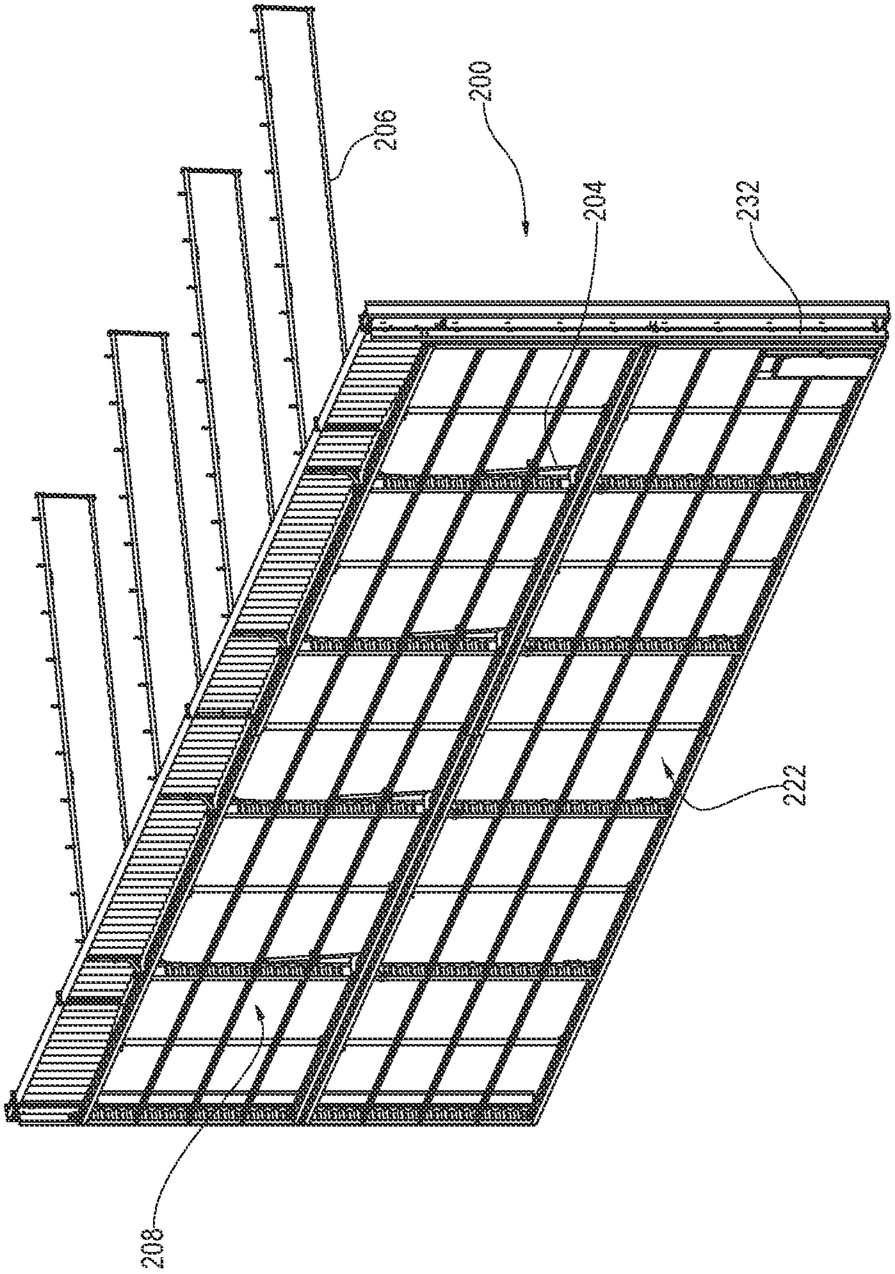

FIG. 3 shows another view of the bifold door (200) shown in FIG. 2. The example of FIG. 2 is a perspective view from inside the building, whereas FIG. 3 is a perspective view from outside the building. The anchor (206), the upper panel (208), the lower panel (222), the second actuator (204), and the rail (232) are shown for reference. The first actuator (202), shown in FIG. 2, is obscured in FIG. 3 by the upper panel (208). In the closed position, both the upper panel (208) and the lower panel (222) are about perpendicular to the anchor (206).

Figure 4:
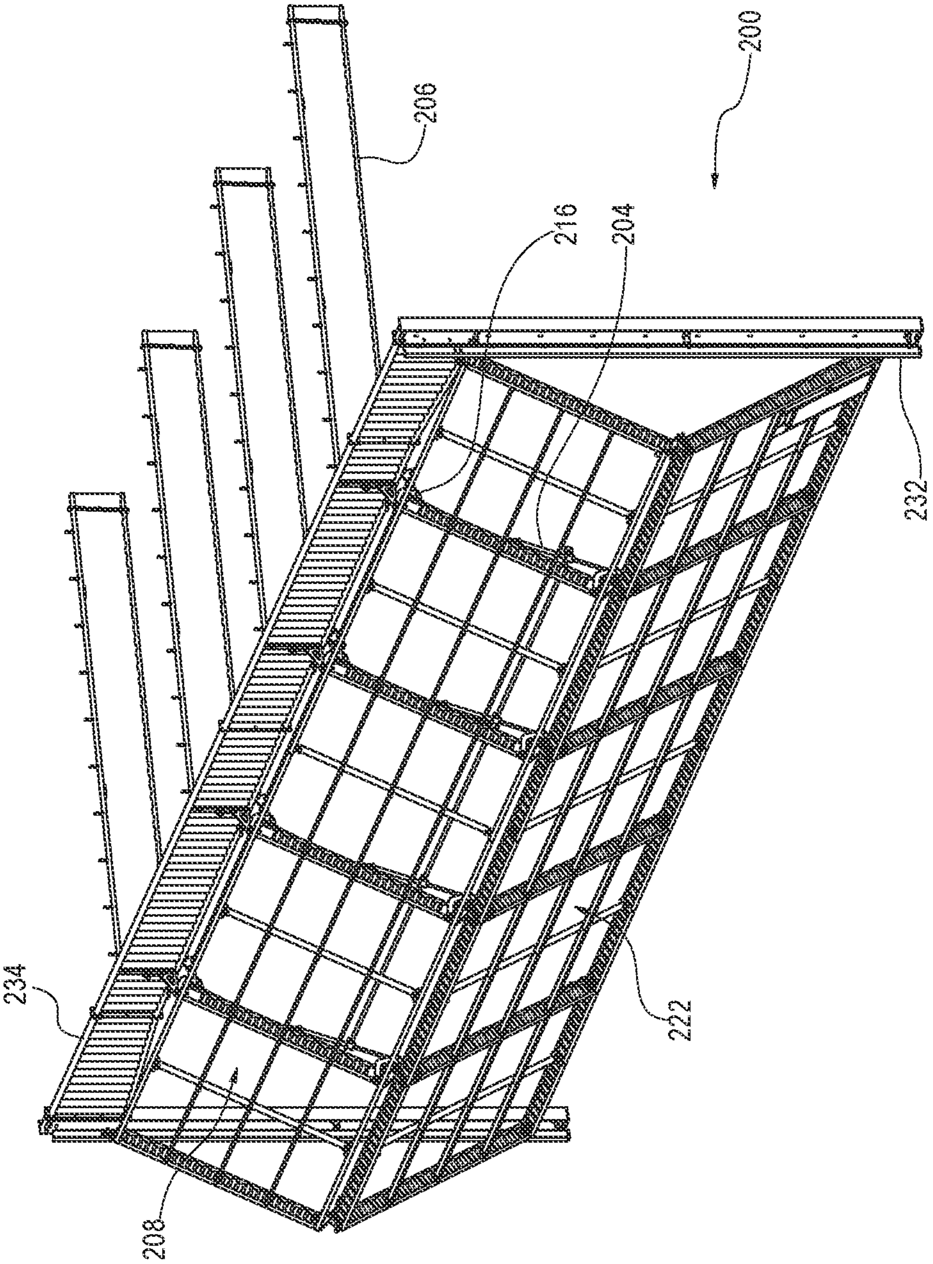

FIG. 4 shows another view of the bifold door (200) shown in FIG. 2. In FIG. 4, the bifold door (200) is in a partially opened state. Again, the anchor (206), the upper panel (208), the lower panel (222), the second actuator (204), the rail (232), and the joist (234) are shown for reference. The first actuator (202), shown in FIG. 2, is obscured in FIG. 3 by the upper panel (208). However, the upper hinge (216), to which the first actuator (202) is connected, may be seen in FIG. 4.

Figure 5:
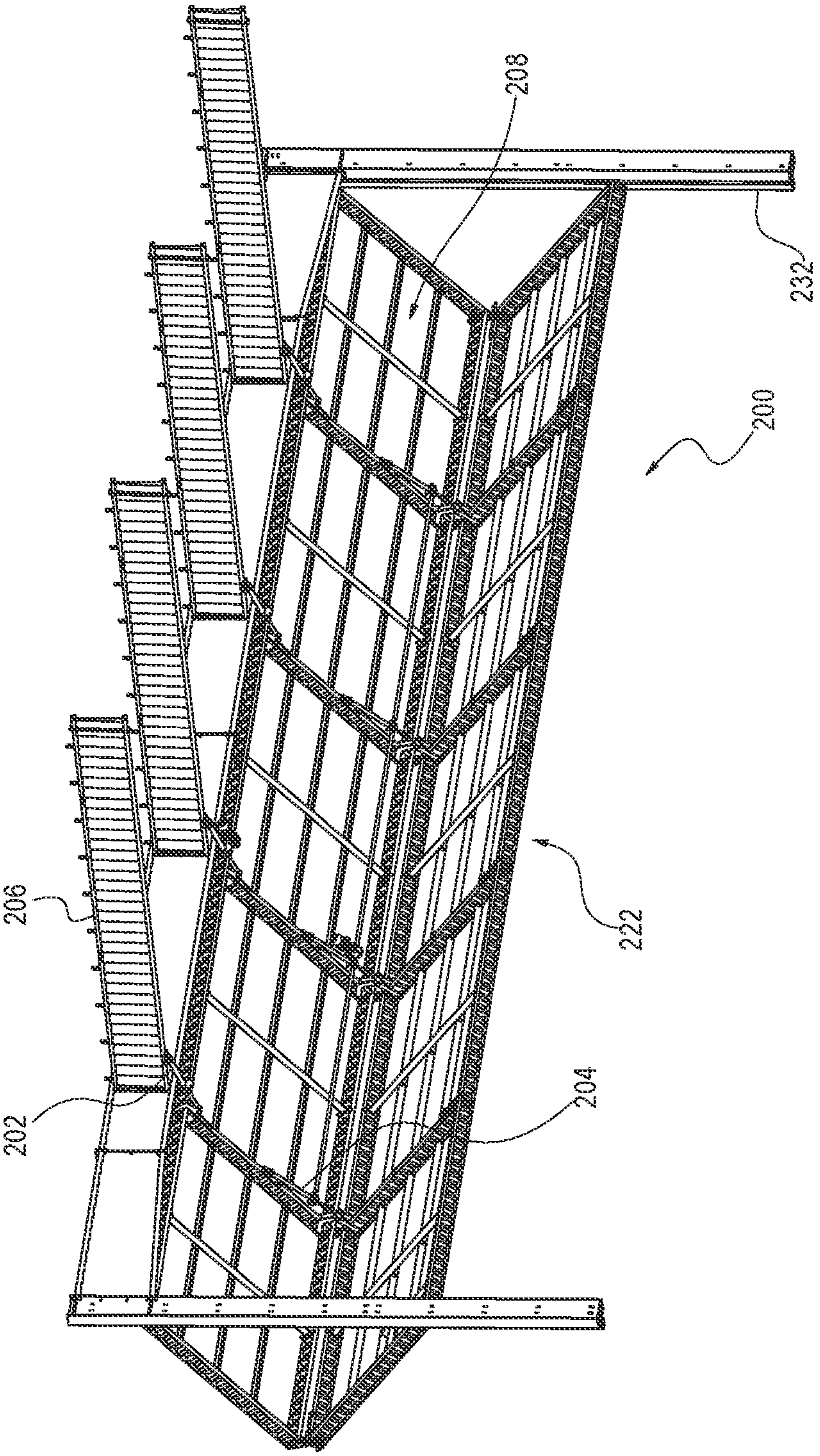

FIG. 5 shows another view of the bifold door (200) shown in FIG. 2. In FIG. 5, the bifold door (200) is in a partially opened state but is opened more fully relative to the position of the bifold door (200) shown in FIG. 4. Again, the anchor (206), the upper panel (208), the lower panel (222), the second actuator (204), and the rail (232) are shown for reference. The first actuator (202) may be seen in FIG. 5.

Figure 6:
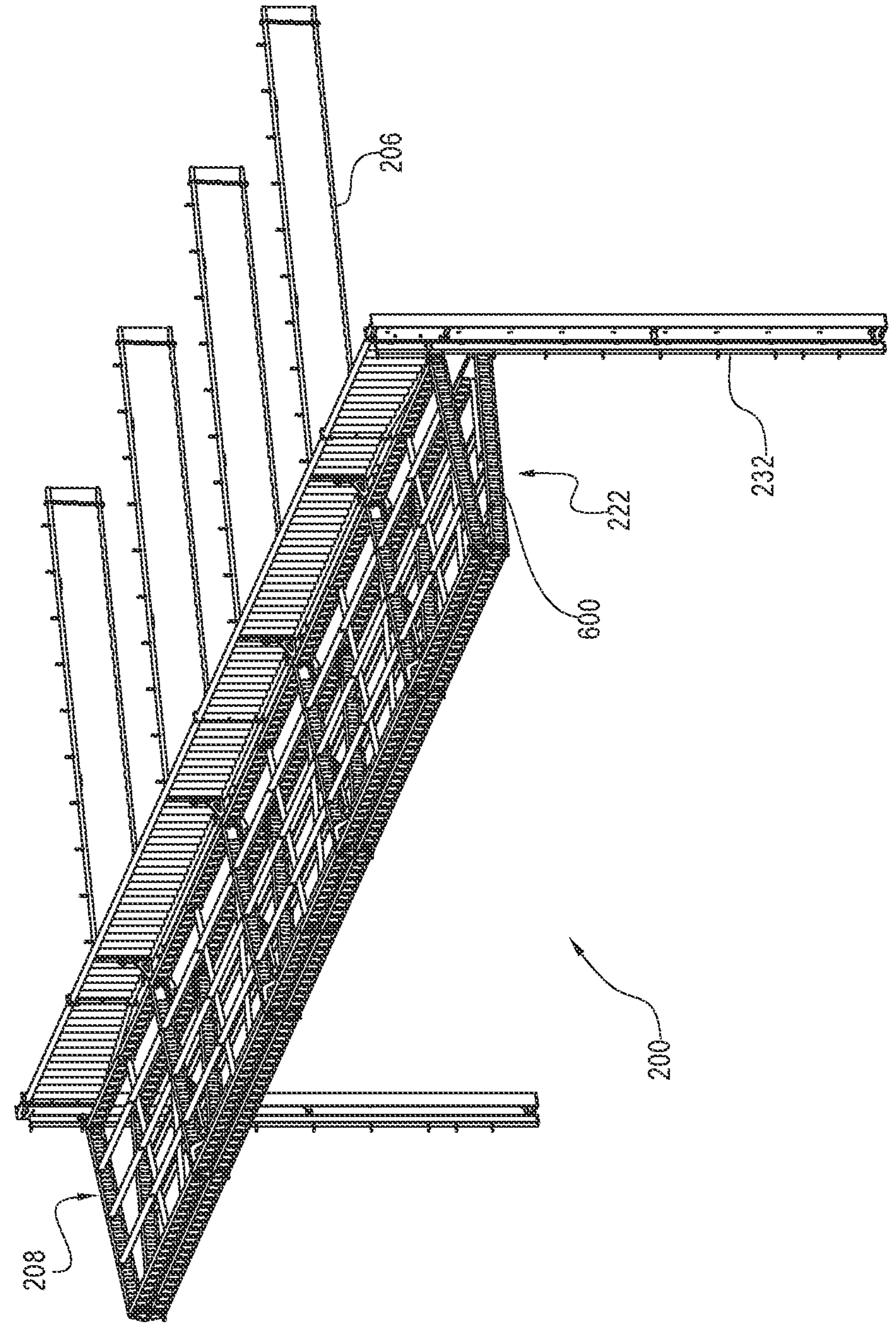

FIG. 6 shows another view of the bifold door (200) shown in FIG. 2. In FIG. 6, the bifold door (200) is in a fully opened state. Again, the anchor (206), the upper panel (208), the lower panel (222), and the rail (232) are shown for reference. Neither the first actuator (202) nor the second actuator (204) may be seen in FIG. 6.

In the fully opened position, the upper panel (208) and the lower panel (222) are in an about parallel relationship with each other, as shown in FIG. 6. Similarly, in the fully open position, the first actuator and the second actuator are in an about parallel relationship to each other. The term “about parallel” means that that an angle (600) between the upper panel (208) and the lower panel (222) at the space between the two panels is less than about 15 degrees. As a result, the upper panel (208) and the lower panel (222) are in about a same plane with each other.

In contrast, as shown in FIG. 2, in the fully closed state, the upper panel (208) and the lower panel (222) are in an about perpendicular relationship with each other. The term “about perpendicular” means that the angle (600) between the upper panel (208) and the lower panel (222) at the space between the two panels is greater than about 85 degrees.

Figure 7:
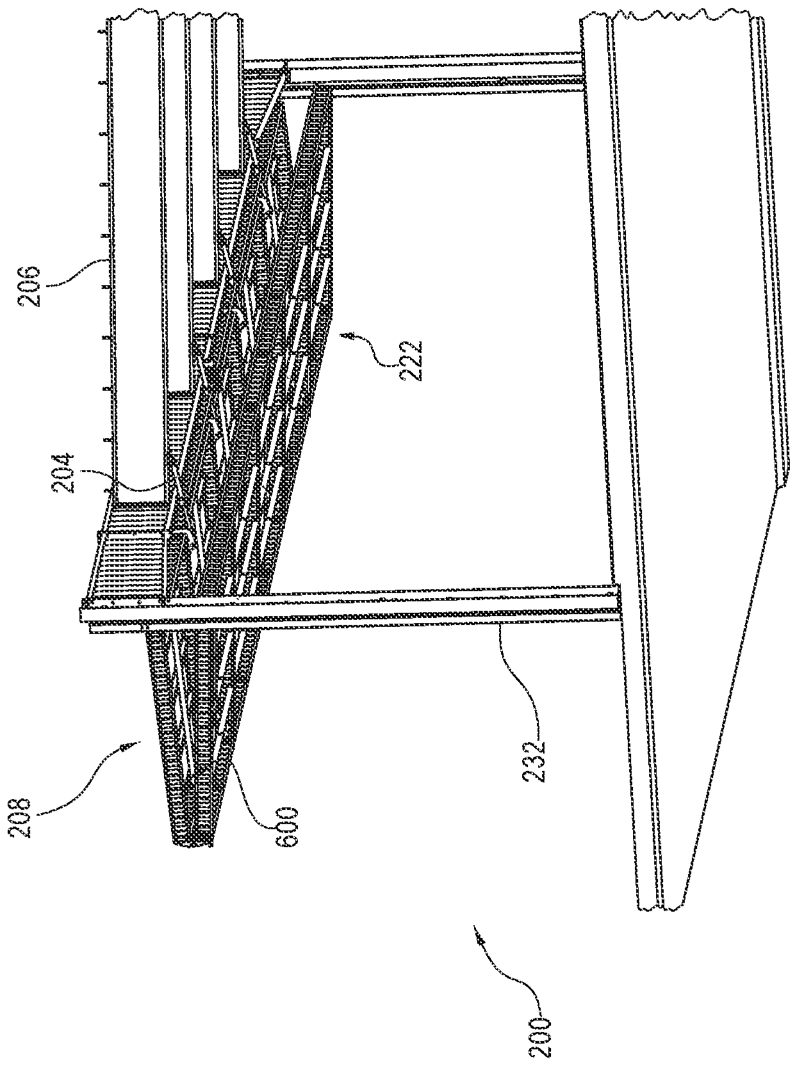

FIG. 7 shows another view of the bifold door (200) shown in FIG. 6. In FIG. 7, the bifold door (200) is in a fully opened state but shown from a different perspective from that shown in FIG. 6. The anchor (206), the upper panel (208), the lower panel (222), the second actuator (204), and the rail (232) are shown for reference. The first actuator (202) is not visible in FIG. 6.

FIG. 8A through FIG. 8C show the bifold door (200) from a side perspective in three different positions. The upper panel (208), the lower panel (222), the first actuator (202), and the second actuator (204) are shown for reference in each of FIG. 8A, FIG. 8B, and FIG. 8C. The rail (232) is shown in FIG. 8B and FIG. 8C. FIG. 8A shows the bifold door (200) in the fully closed position. FIG. 8B shows the bifold door (200) in a partially opened position. FIG. 8C shows the 200 in a fully open position.

Note that the first actuator (202) is shown as projecting inside the bifold door (200). However, optionally, the first actuator (202) may be differently arranged, such being vertically arranged with respect to the upper panel (208), relative to gravity, and connected to the anchor (206) and the upper lip of the upper panel (208). In this example, the first actuator (202) may extend only in a vertical direction as the first actuator (202) moves the upper panel (208) upwardly and downwardly with respect to gravity.

Figure 11:
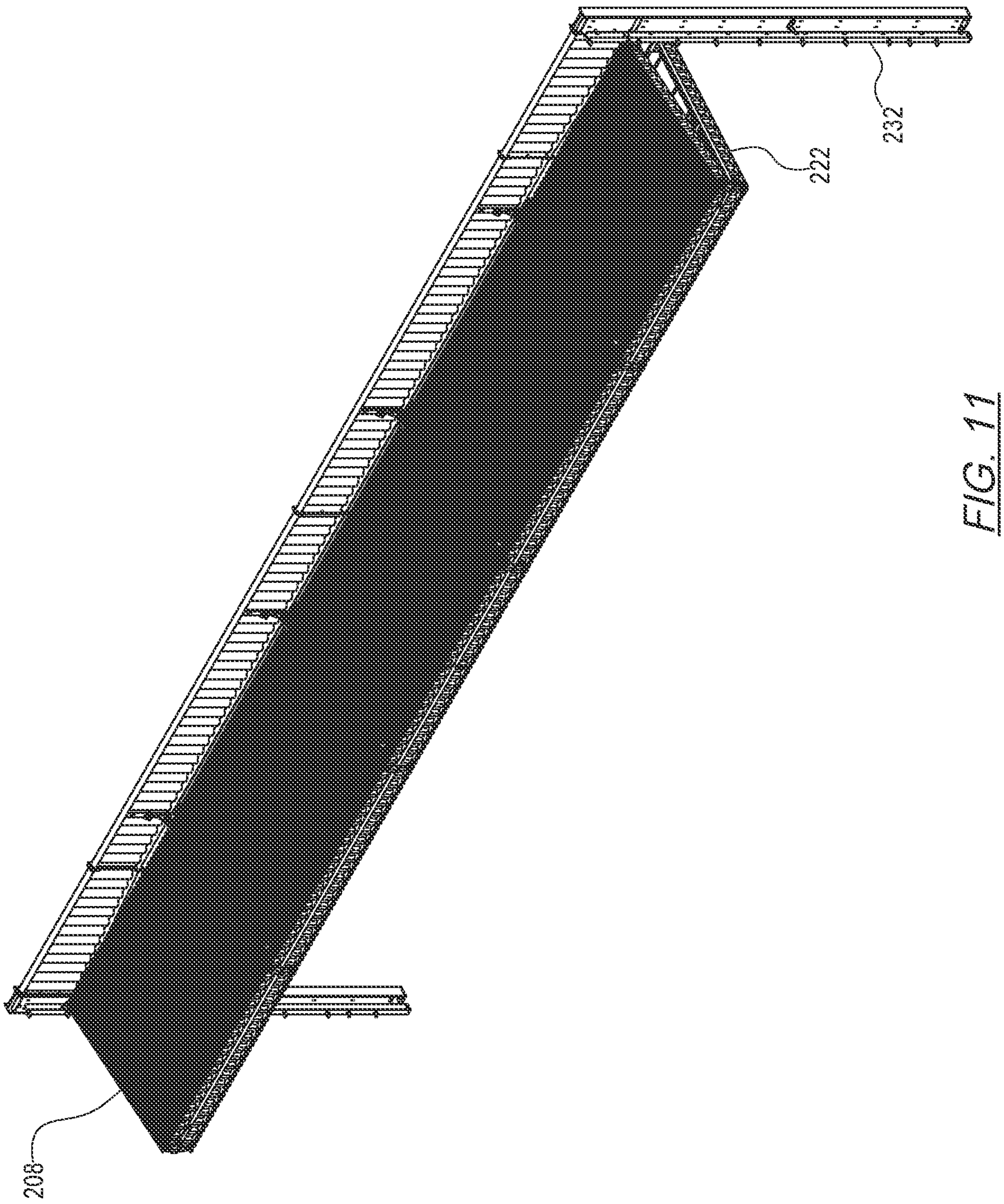

FIG. 9, FIG. 10, and FIG. 11 show schematics of the bifold door (200) of FIG. 2 through FIG. 8C, in use, in accordance with one or more embodiments. The first actuator (202), the second actuator (204), the anchor (206), the upper panel (208), the lower panel (222), the rail (232), and the guide roller (238) are shown for reference.

In the examples of FIG. 9 and FIG. 10, the same door is shown in multiple positions, along with the paths taken by the bifold door during a lift or lower operation. Thus, one door is shown in two different positions. One of the positions of the door is shown in solid lines; the other position of the door is shown in dashed lines.

The paths taken by the panels are shown by sweep lines, such as sweep line (900), sweep line (902) in FIG. 9 and sweep line (1000) and sweep line (1002) in FIG. 10. Exemplary distances, angles, and lengths are shown, but do not necessarily limit the one or more embodiments, as the components of the bifold door (200) may be varied from the dimensions shown in FIG. 10. FIG. 11 provides another perspective view of the bifold door, when fully opened.

In the examples of FIG. 9 through FIG. 11, the first actuator (202) is connected differently, relative to the connections of the first actuator (202) shown in FIG. 2 through FIG. 8C. In particular, the first actuator (202) is oriented to extend upwardly past the anchor (206) when the bifold door (200) is in an open position or in a partially open position. Thus, the arrangement of the actuators shown in the figures are exemplary and may be varied while still providing adequate support to the edges of the bifold door (200) to prevent the bowing shown in FIG. 1.

FIG. 12, FIG. 13, FIG. 14, FIG. 15, FIG. 16, FIG. 17 show details of the bifold door of FIG. 2 through FIG. 11, in accordance with one or more embodiments. FIG. 12 through FIG. 17 share reference numerals in common with FIG. 2 through FIG. 11. Common reference numerals refer to objects having similar definitions and functions. For example, the bifold door (200) shown in FIG. 12 through FIG. 17 includes the upper panel (208), the vertical reinforcing beam (212), the lower panel (222), the rail (232), and other components described with respect to FIG. 2 through FIG. 11. However, the embodiments shown in FIG. 12 through FIG. 17 include other features, as described below.

For example, referring to FIG. 12, one or more joint hinges may be provided, such as outer joint hinge (1200) and inner joint hinge (1202). The terms "outer" and "inner" are nonce terms to clearly indicate which joint hinge is referenced. The terms "outer" and "inner" may be reversed or varied if more or fewer joint hinges are present.

The joint hinges may be optional in some embodiments in order to provide additional stiffening or reinforcement of the bifold door (200). The joint hinges may be connected to both the lower edge (218) of the upper panel (208) and to the upper edge (228) of the lower panel (222). Specifically, the clevis portion (1204) of the outer joint hinge (1200) and the clevis portion (1204) of the inner joint hinge (1202) may be within the space (250) that is defined by a space between the upper panel (208) and the lower panel (222). The clevis portion (1204) of the outer joint hinge (1200) and the inner joint hinge (1202) also may extend inwardly past the edges of the space (250). The term "inwardly" means pointing in a direction away from direction of opening between the upper panel (208) and the lower panel (222).

The embodiment shown in FIG. 12 also includes several mechanical stops, such as mechanical stop (1208) and mechanical stop (1210). The mechanical stops may force a pre-determined amount of space to remain between the outer lip (1212) of the lower edge (218) and the outer lip (1214) of the upper edge (228). The forced space may relieve undesirable stresses on the clevis portions on the joint hinges when the bifold door (200) is in a closed position.

The mechanical stops may be flat-headed pegs mounted to either the lower edge (218) of the upper panel (208) or the upper edge (228) of the lower panel (222). Different shaped objects, including blocks, or round-head pegs may be used for the mechanical stops. In yet another embodiment, the mechanical stops may be springs or telescoping rods having internal springs. In the case of a mechanical stop having a spring, the mechanical stop may be connected to one or both of the lower edge (218) of the upper panel (208) and the upper edge (228) of the lower panel (222).

FIG. 12 also shows the second actuator (204). The second actuator (204) in the example of FIG. 12 is a hydraulic cylinder. Optionally, the second actuator (204) may be provided with a linear transducer in order to achieve lift without a guide rail. A control system, possibly remote from the bifold door (200), may control the linear transducer.

The second actuator (204) is connected to the vertical reinforcing beam (212) via a hinge mount (1216). The hinge mount (1216) may have a surface that is flush with, and either bolted, screwed, or welded to the vertical reinforcing beam (212). The hinge mount (1216) also includes a hinge that permits a first end (1218) of the second actuator (204) to rotate as the upper panel (208) rotates during opening and closing of the bifold door (200).

A second end (1220) of the second actuator (204) is indirectly connected to the lower panel (222) via the claw hinge (226). As can be seen in FIG. 12, the claw hinge (226) is connected to the vertical reinforcing beam (212) of the upper panel (208) above the lower edge (218) of the upper panel (208). The claw hinge (226) also is connected to a second vertical reinforcing beam (1222) of the lower panel (222) below the upper edge (228) of the lower panel (222).

In an embodiment, a crank mechanism (1224) may be included in the common joint (1226) of the claw hinge (226). The crank mechanism (1224) may help the claw hinge (226) to achieve a near 180 degree fold as the bifold door (200) is opened to a fully open position.

Attention is now turned to FIG. 13. FIG. 13 shows a bottom corner of the bottom edge (230) of the lower panel (222). The rail (232) is shown for reference. The guide roller (238) is shown disposed inside the rail (232) in a manner that the guide roller (238) may roll along the longitudinal length of the rail (232).

A seal (1300) may be provided under the bottom edge (230) of the lower panel (222). The seal (1300) may aid in preventing moisture, particulates, or wind from passing underneath the lower panel (222).

Attention is turned to FIG. 14, which shows a close-up view of the space (250) between the upper panel (208) and the lower panel (222). The second actuator (204), the upper panel (208), the lower panel (222), the claw hinge (226), the space (250), the inner joint hinge (1202), the mechanical stop (1210), and the crank mechanism (1224) are shown for reference. Additional detail of the crank mechanism (1224) is shown.

Briefly, the crank mechanism may be detents disposed in one of the second actuator (204) or the claw hinge (226). The detents are aligned to fit within slots or indentations in the other of the second actuator (204) or the claw hinge (226). The crank mechanism may be controlled by the linear actuator described above with respect to FIG. 12.

Figure 15:
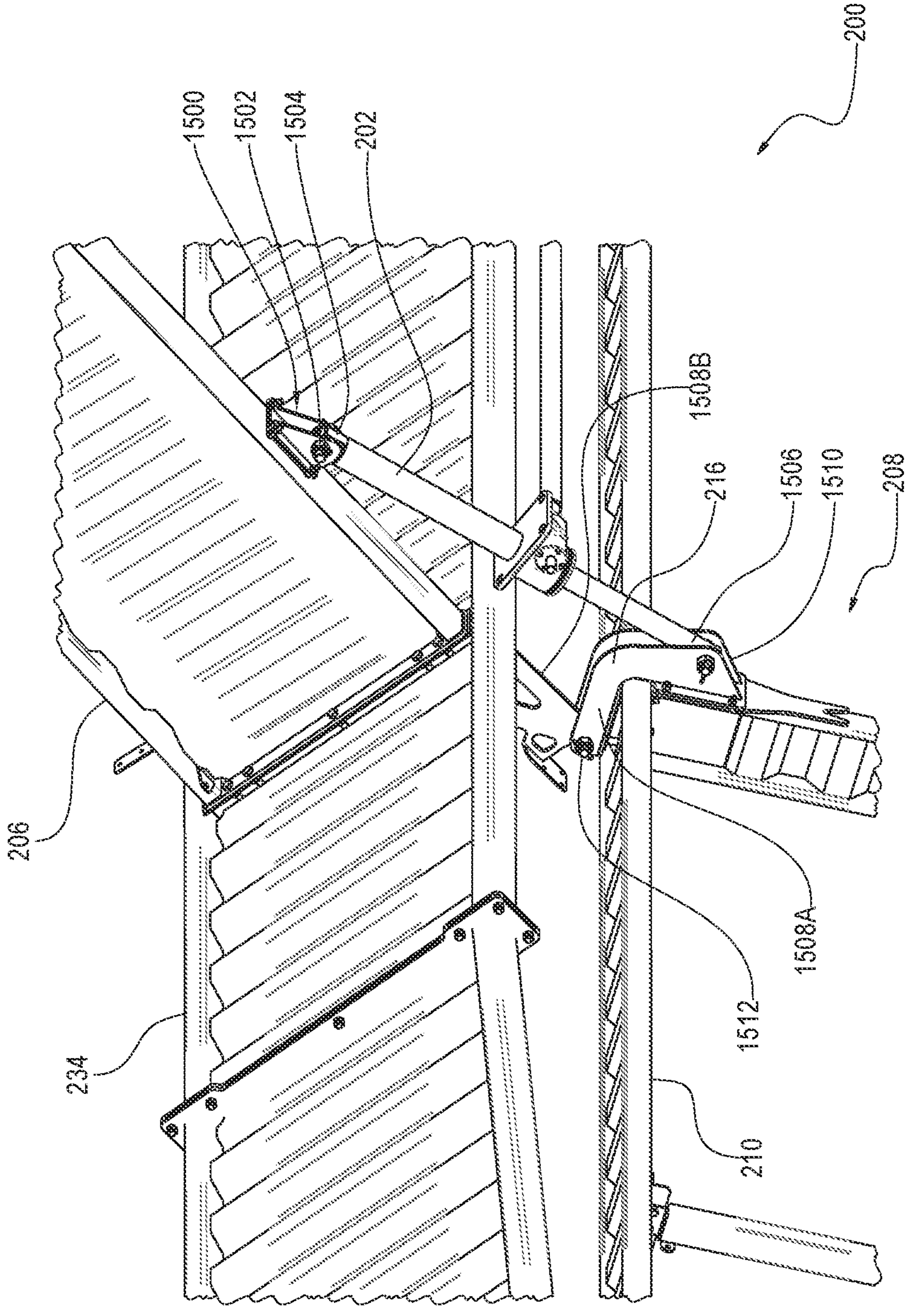

FIG. 15 shows additional details of the connection points of the first actuator (202). The first actuator (202) may be connected to the anchor (206) via a second hinge mount (1500). The second hinge mount (1500) may be flush with and connected to an edge of the anchor (206) via welding, bolting, screwing, etc. A rotatable hinge portion (1502) permits a proximal end (1504) of the first actuator (202) to rotate as the bifold door (200) opens and closes.

A distal end (1506) of the second actuator (204) is connected to the upper hinge (216). In the example of FIG. 15, the upper hinge (216) is a bracket having a bottom bracket portion (1508A) and a top bracket portion (1508B). Between the bottom bracket portion (1508A) and the top bracket portion (1508B) of the bracket is an integrated hinge portion (1510). The bottom bracket portion (1508A) fits around the top edge (210) of the upper panel (208). The integrated hinge portion (1510) permits the distal end (1506) of the first actuator (202) to rotate as the bifold door (200) opens and closes.

Additionally, the upper hinge (216) may include a second integrated hinge portion (1512). The second integrated hinge portion (1512) permits rotation of the bottom bracket portion (1508A) relative to the top bracket portion (1508B). The top bracket portion (1508B) is connected to a mounting plate (1514) (see FIG. 16). The mounting plate (1514) is also fixedly connected to the joist (234) or to the anchor (206). The mounting plate (1514) (see FIG. 16) provides additional support to keep the bifold door (200) in place relative to the anchor (206).

Attention is now turned to FIG. 16. FIG. 16 shows another view of the bottom bracket portion (1508A) and the top bracket portion (1508B) described with respect to FIG. 15. The second actuator (204) and the joist (234) are shown for reference. As shown, the top bracket portion (1508B) is connected to the joist (234) via a mounting plate (1514).

Figure 17:
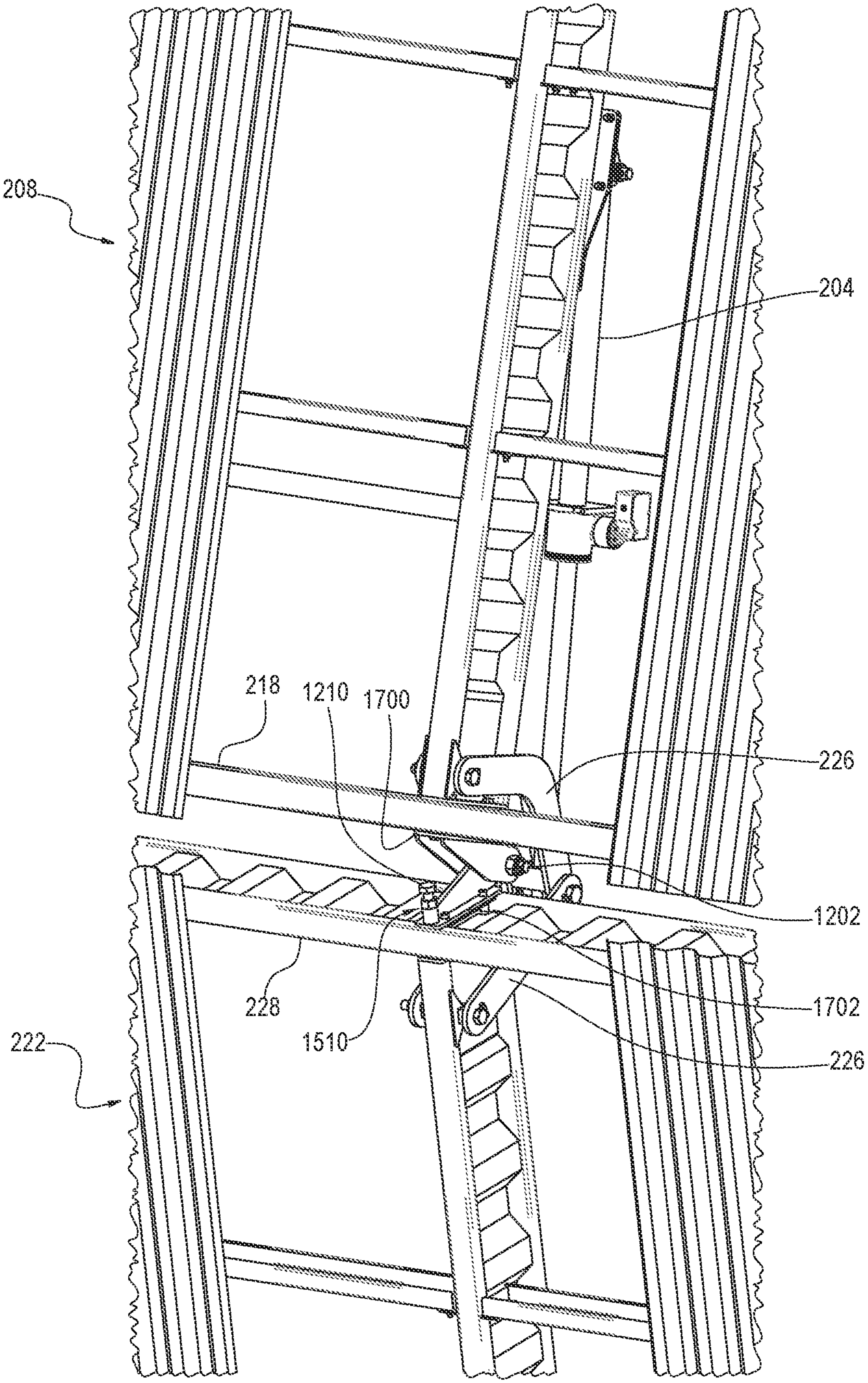

Attention is now turned to FIG. 17. FIG. 17 shows another view of the inner joint hinge (1202) and the mechanical stop (1210) shown in FIG. 12. The second actuator (204) and the claw hinge (226) are shown for reference. In the view shown in FIG. 17, it can be seen that the inner joint hinge (1202) is fixedly connected (bolted, welded, etc.) to the lower edge (218) of the upper panel (208) via an upper plate (1700). Similarly, the inner joint hinge (1202) is fixedly connected (bolted, welded, etc.) to the upper edge (228) of the lower panel (222) via a lower plate (1702).

Certain elements of the one or more embodiments shown in FIG. 12 through FIG. 17 may be varied without departing from the scope of the one or more embodiments. For example, as indicated above, different types of actuators (other than hydraulic actuators) may be used. A claw bracket system (such as the claw hinge (226) shown in FIG. 12) connects the two door halves, though in other embodiments a different connecting bracket system could be used. Several other components are shown and described as being optional in some embodiments, such as a stop connected to the lower panel and disposed between a space separating the upper panel and the lower panel.

Attention is now turned to examples of uses of the bifold door (200) shown in FIG. 2 through FIG. 17. FIG. 18A through FIG. 18D show three different bifold doors arranged side-by-side. Shown in all four of FIG. 18A through FIG. 18D are a first outer bifold door (1800), a second outer bifold door (1802), and a central bifold door (1804). Note that the central bifold door does not necessarily use rails, thereby showing that the rail (232) shown in FIG. 2 may be optional in some embodiments.

Figure 18A:
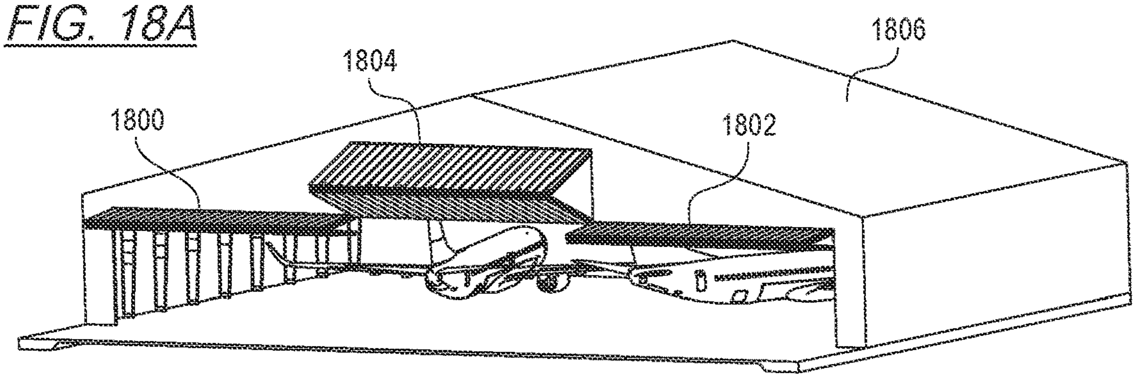
FIG. 18A, FIG. 18B, FIG. 18C, FIG. 18D, FIG. 19A, FIG. 19B, FIG. 19C, FIG. 20A, FIG. 20B, FIG. 20C, and FIG. 20D show an arrangement of three bifold doors for an aircraft hangar, in accordance with one or more embodiments.

FIG. 18A shows all three bifold doors opened, with the central bifold door (1804) in a partially opened state. The clearance heights shown in FIG. 18A are exemplary for a specific hangar (1806). However, the sizes and dimensions of the various components of the first outer bifold door (1800), the second outer bifold door (1802), and the central bifold door (1804) may be varied to suit a particular building or for a particular purpose.

Figure 18B:
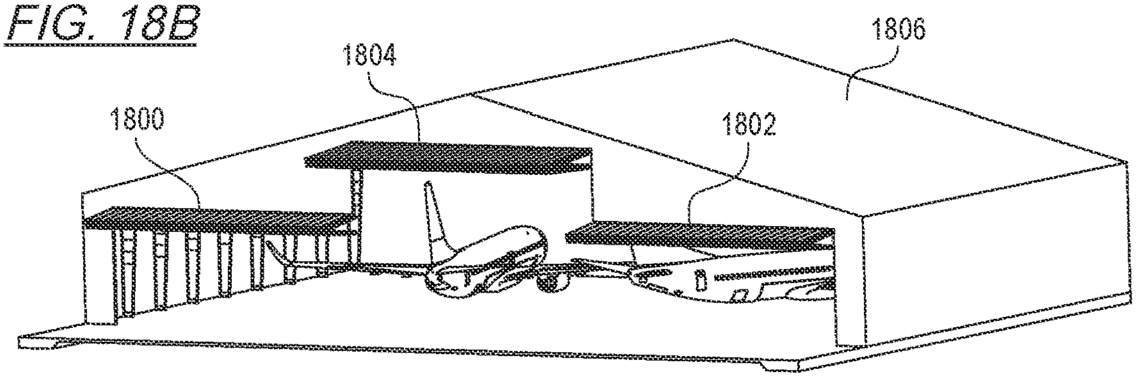

FIG. 18B shows all three of the first outer bifold door (1800), the second outer bifold door (1802), and the central bifold door (1804) in a fully opened state. Again, the clearances shown are exemplary.

Figure 18C:
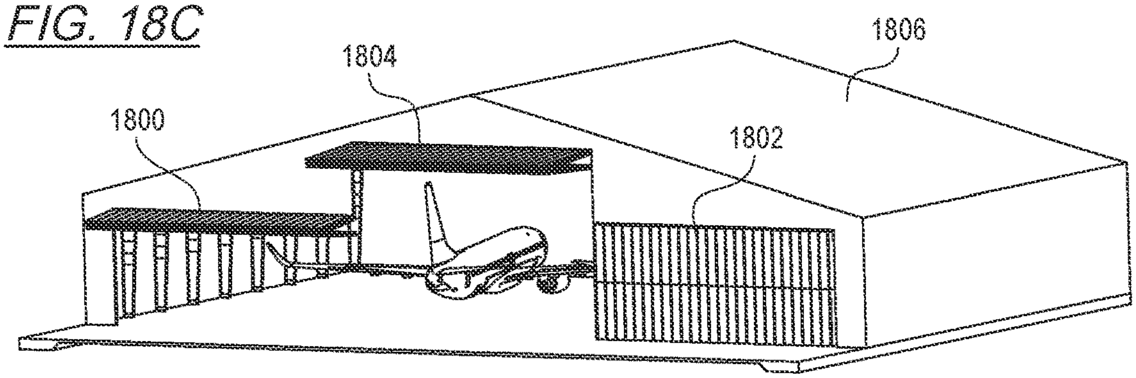

FIG. 18C shows the first outer bifold door (1800) and the central bifold door (1804) in a fully opened state, but the second outer bifold door (1802) in a fully closed state. Thus, the bifold doors may be operated independently of each other in some embodiments. Again, the clearances shown are exemplary.

Figure 18D:
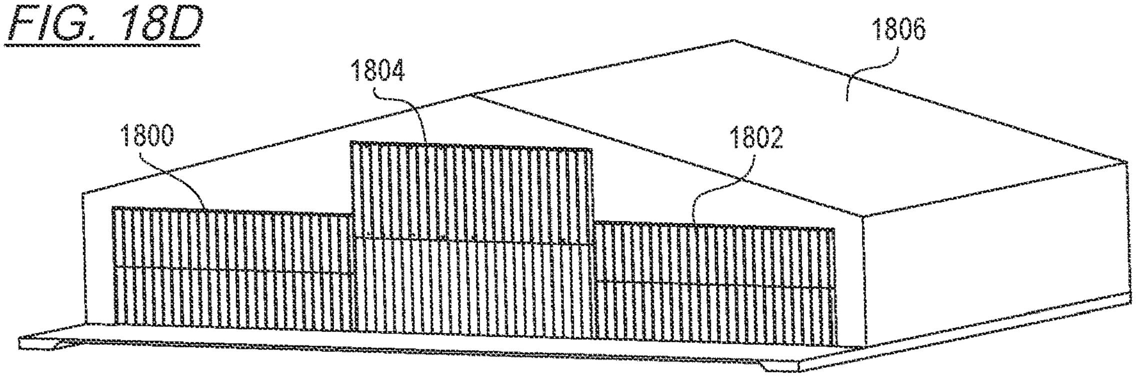

FIG. 18D shows all three of the first outer bifold door (1800), the second outer bifold door (1802), and the central bifold door (1804) in a fully closed state. Other combinations of the opened and closed states of the bifold doors are possible, as again the bifold doors may be operated independently of each other.

Figure 19A:
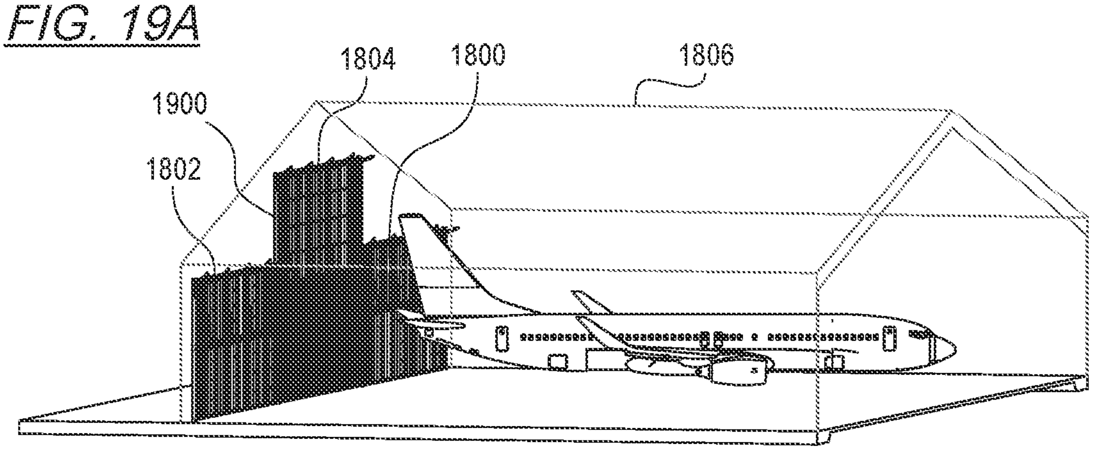
Figure 19B:
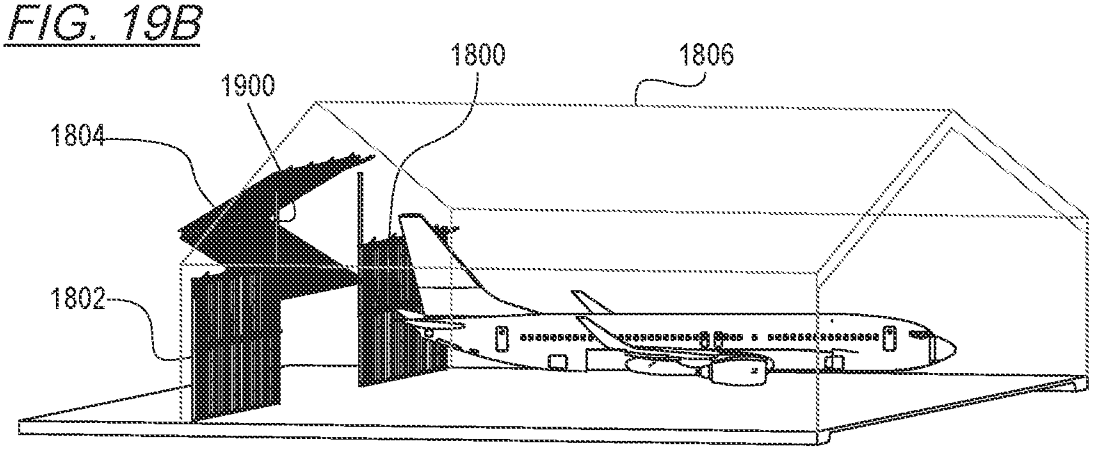
Figure 19C:
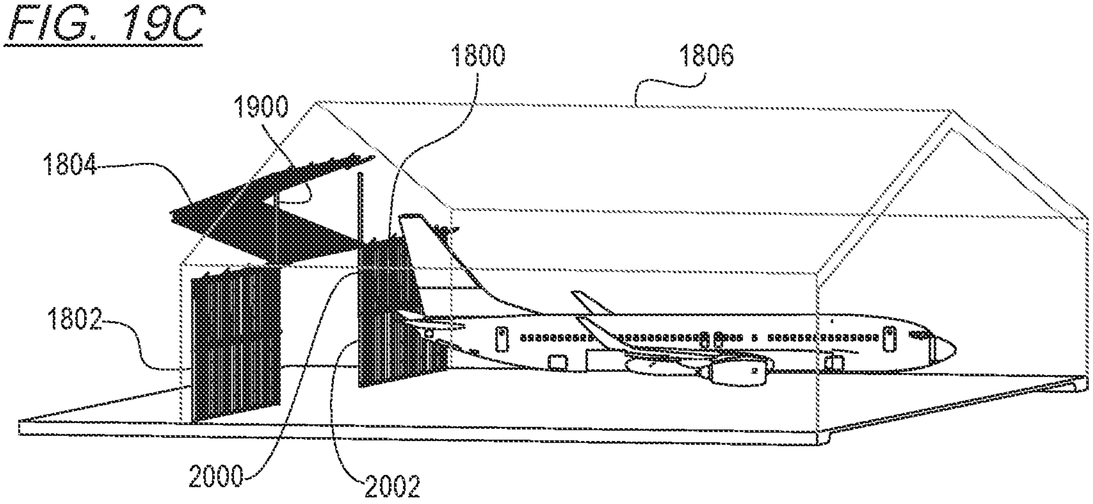
Figure 20A:
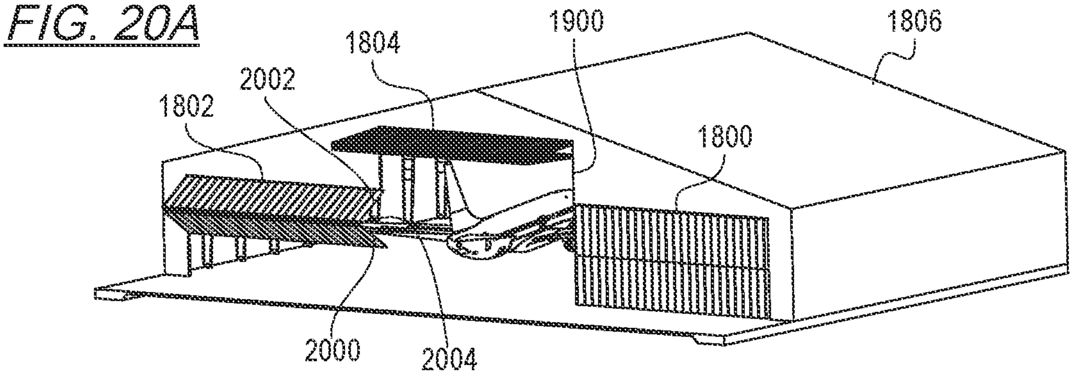
Figure 20B:
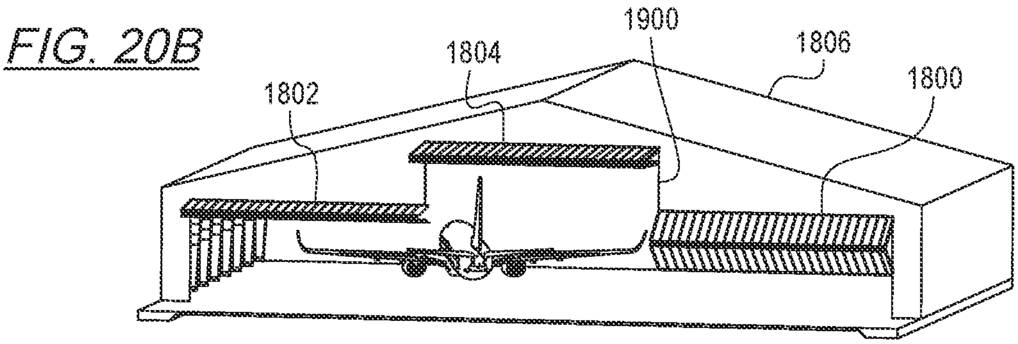
Figure 20C:
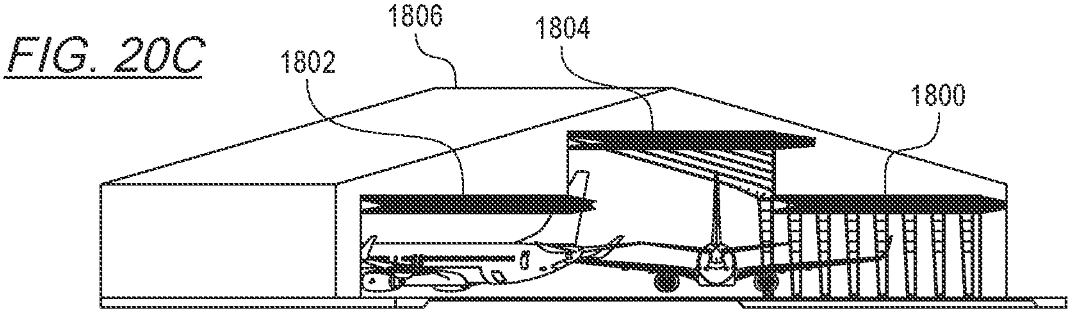
Figure 20D:
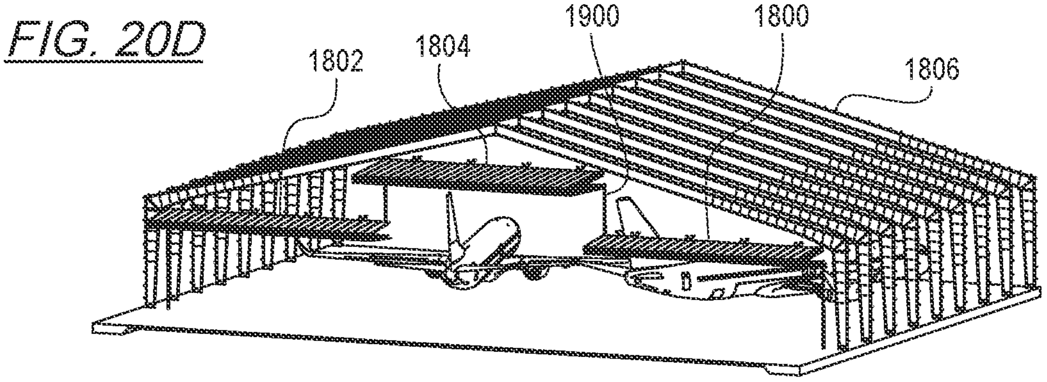

FIG. 19A through FIG. 19C show different perspectives of the three bifold door system shown in FIG. 18A through FIG. 18D. The first outer bifold door (1800), the second outer bifold door (1802), and the central bifold door (1804) are shown for reference. In this example, it can be seen that the central bifold door (1804) is opened half-way up, and then the first outer bifold door (1800) and the second outer bifold door (1802) may be raised. In this example, upper rails (1900) (shown in FIG. 19B and FIG. 19C) are provided in the specific hangar (1806) above a certain height, but not at where the central bifold door (1804) is adjacent the second outer bifold door (1802) or the first outer bifold door (1800).

FIG. 20A through FIG. 20D show alternative views and operations of the three bifold door arrangement shown in FIG. 18A through FIG. 19C. The first outer bifold door (1800), the second outer bifold door (1802), the central bifold door (1804), and the specific hangar (1806) are shown for reference in all of FIG. 20A, FIG. 20B, FIG. 20C, and FIG. 20D.

In the example of FIG. 20A through FIG. 20D, the second outer bifold door (1802) and the central bifold door (1804) have folding tracks (a first folding track (2000) connected to the first outer bifold door (1800) and a second folding track (2002) connected to the second outer bifold door (1802)). The folding tracks have a joint portion, such as joint portion (2004). The joint portion may rotate, permitting the corresponding folding track to fold as the bifold doors are opened and closed. The folding tracks permit the guide roller in the central bifold door (1804) to roll within the folding tracks to provide additional stability for the central bifold door (1804) during opening and closing.

FIG. 20A through FIG. 20D show that the outer doors (the first outer bifold door (1800) and the second outer bifold door (1802)) may be opened after the central bifold door (1804) clears the folding tracks. The rollers connected to the central bifold door (1804) should not be disposed within the folding tracks when the outer doors are in any open state, in order to prevent undue stresses on any of the bifold doors or their components.

Referring to FIG. 2 through FIG. 20D, an alternative description of the one or more embodiments is now provided. The bifold door of the one or more embodiments may use hydraulic cylinders (actuators) to lift the bifold door from the top cylinders. The complete door mass is supported from the transfer beam or frame element of the building. This arrangement is the main reason deflections (stresses or bowing) are small compared to bifold doors without a top door lift and mid door fold.

Mid cylinders are used to fold the lower half of the bifold door under. Cylinders may be sized to keep pressures similar and reduce guide roll forces.

The guide rollers may be used to synchronize the bifold door lower & upper half, and do not carry high loads. The guide rollers allow use of simple hydraulics without complex guidance and control systems to keep door swept volume in a defined and small area. The guide rollers allow the bifold door to carry wind loads while lifting the bifold door, in excess of what can be carried by the hydraulic system alone.

Guide rails allow mounting of redundant safety locks to lock the bifold door in the up or part way up position to provide safe working areas under the bifold door, if this is desired. The cylinders may have load check valves to prevent unexpected lowering if there is a hose or valve failure.

There may be a reduction in apron area in front of door compared to single leaf tilt doors. Panel doors that retract into the building shield lighting and access to ceiling space. Thus, the bifold door of the one or more embodiments provide advantages over existing bifold doors or other kinds of doors.

Adding mechanical locks in place of or adjacent to mechanical stops at the fold line is possible. Such locks or stops may increase allowed wind loads when used along with lock pins into the floor.

Electric screw jacks could be used as the actuators. A control system may be used to synchronize the electric screw jacks, if used with guide rollers.

Linear displacement transduces on hydraulic or electric actuators allow removal of the guide rail if this was desired. In this case, an added control system may be used to coordinate operation of the actuators.

The one or more embodiments resolve a variety of issues in traditional bifold door arrangements. The issues revolved include reduction or elimination of bending or deflection through the front hinge. Additionally, the folds (panels) fold more tightly together than any existing bifold doors (allowing much more overall height for the bifold door).

The bifold door of the one or more embodiments includes few moving parts (other than the hinges, seal roller bearings & and guide roller on edge (which does not have load on it)). Thus, the bifold door of the one or more embodiments are more reliable than other bifold doors.

The one or more embodiments may be more resistant to a higher wind load and operate in high wind loads. The one or more embodiments are capable of fast instillation.

The one or more embodiments have improved reliability, due to no straps, pullies or cables, or hinge sag which might cause existing bifold doors to lock open. The one or more embodiments provide for minimal deflection along the bifold door (especially on spans greater than 80 ft.)

The one or more embodiments may be operated safely in high wind. The one or more embodiments do not encroach inside the building (which may be valuable for high tail aircraft, lighting and other overhead items such as large fans and overhead gantries.

The one or more embodiments may have minimal maintenance requirements, as the hinge and ram bolts are durable. The one or more embodiments are lightweight, relative to other bifold doors, as no cross-brace is needed to be installed along a length of the joint on the upper section of the bifold door.

The one or more embodiments may be installed onto conventual web trusses of a frame element of the building. Thus, the bifold door of the one or more embodiments may provide easy and quick installation, relative to other types of bifold doors.

The one or more embodiments may be provided with built-in safety features, such as counterbalance rams, and can operate safely with some rams failing. Additionally, due to minimal deflection, glass can be used as the “cladding” for the bifold door, thereby taking advantage of improved structural integrity via reduced loads on cladding on the bifold door.

For very large aircraft hangars (spans over about 50 feet), multiple doors may be installed beside one another, allowing for the large aircraft such as the A380®, a trademark of Airbus. For example, see FIG. 18A through FIG. 20D.

Figure 21:
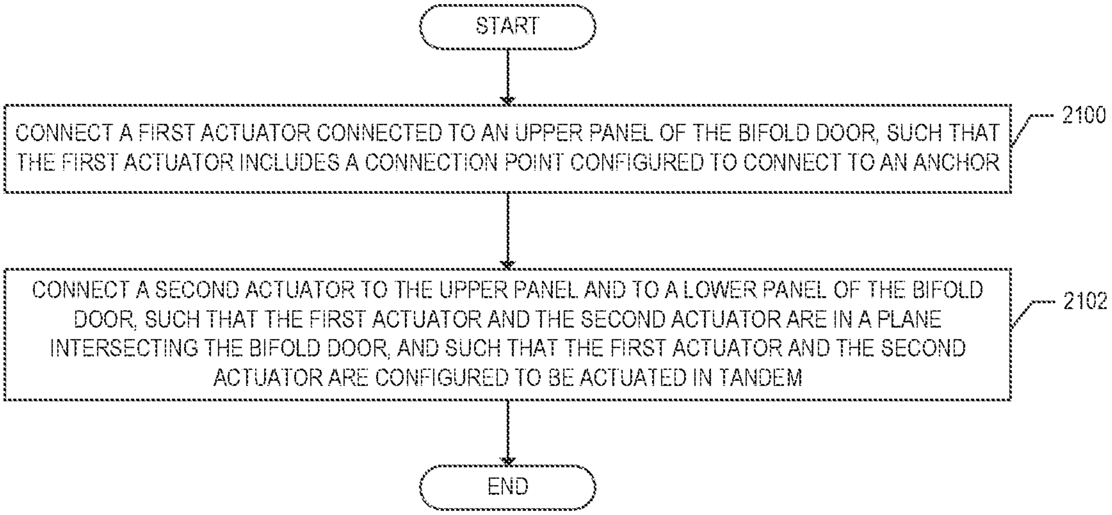
FIG. 21 and FIG. 22 show flowcharts of a method of manufacturing a bifold door, in accordance with one or more embodiments.

Attention is now turned to FIG. 21. FIG. 21 shows a method of manufacturing a bifold door, in accordance with one or more embodiments. The method of FIG. 21 may be used to manufacture the bifold door shown in FIG. 2 through FIG. 17.

Step 2100 includes connecting a first actuator connected to an upper panel of the bifold door, where the first actuator further includes a connection point configured to connect to an anchor. Connecting may be accomplished by welding, bolting, screwing, or using other types of connectors.

Step 2102 includes connecting a second actuator to the upper panel and to a lower panel of the bifold door, as follows. The first actuator is configured to rotate the upper panel. The second actuator is configured to rotate lower panel. The first actuator and the second actuator are in a plane intersecting the bifold door. For example, the first actuator and the second actuator may be disposed along a same vertical line, relative to gravity, when attached to the bifold door as described above. The first actuator and the second actuator are configured to be actuated in tandem. Again, connecting may be accomplished by welding, bolting, screwing, or using other types of connectors.

The method of FIG. 21 may be varied. For example, connecting may include connecting the connection point to the anchor. The method also may include connecting a guide roller connected to a side of the lower panel.

In another embodiment, the method may include connecting a rail to a side of a building. In this case, the method also includes inserting the guide roller into the rail.

Figure 22:
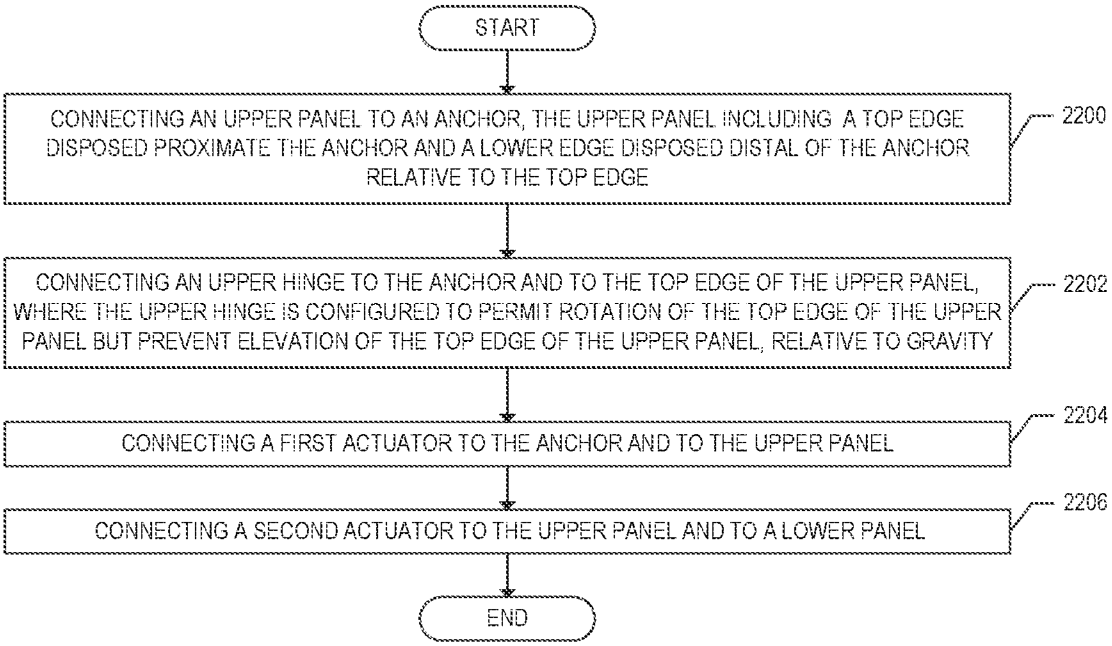

Attention is now turned to FIG. 22. FIG. 22 is another method of manufacturing a bifold door. The method of FIG. 22 is a variation of the method of FIG. 21.

Step 2200 includes connecting an upper panel to an anchor, the upper panel including a top edge disposed proximate the anchor and a lower edge disposed distal of the anchor relative to the top edge. Connecting may be accomplished using fasteners or welding, as described with respect to FIG. 21.

Step 2202 includes connecting an upper hinge to the anchor and to the top edge of the upper panel, where the upper hinge is configured to permit rotation of the top edge of the upper panel but prevent elevation of the top edge of the upper panel, relative to gravity. Connecting may be accomplished using fasteners or welding, as described with respect to FIG. 21.

Step 2204 includes connecting a first actuator to the anchor and to the upper panel. Connecting may be accomplished using fasteners or welding, as described with respect to FIG. 21.

In an embodiment, the first actuator is configured to rotate the upper panel. The upper panel of the bifold door rotates relative to the anchor, but remains fixed relative to horizontal and vertical directions relative to gravity. In this embodiment, the second actuator is configured to rotate the lower panel. The second actuator also may rotate at a second actuator mounting point where the second actuator is mounted to the upper panel.

In another embodiment, the first actuator is configured to lift the lower edge of the upper panel upwardly relative to the direction of gravity and outwardly relative to the anchor. The first actuator is further configured to extend along a length of the first actuator to effect lifting of the upper panel.

Step 2206 includes connecting a second actuator to the upper panel and to a lower panel. Connecting may be accomplished using fasteners or welding, as described with respect to FIG. 21.

In an embodiment, the lower panel is separated from the upper panel, the lower panel including an upper edge disposed proximate the lower edge of the upper panel, and a bottom edge disposed distal of the lower edge of the upper panel. The second actuator is configured to lift the upper edge of the lower panel upwardly relative to the direction of gravity and outwardly relative to the anchor. The second actuator may be further configured to retract along a length of the second actuator to effect lifting of the lower panel. Alternatively, in either case, the first and second actuators may be rotating actuators, in which case the actuators need not extend.

While the various steps in the flowcharts of FIG. 21 and FIG. 22 are presented and described sequentially, one of ordinary skill will appreciate that some or all of the steps may be executed in different orders, may be combined or omitted, and some or all of the steps may be executed in parallel. Furthermore, in some embodiments the steps may be performed actively and/or passively. Thus, the one or more embodiments are not necessarily limited by the examples provided herein.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For example, two angles may be "about congruent" if the values of the two angles are within a first predetermined range of angles for one embodiment, but also may be "about congruent" if the values of the two angles are within a second predetermined range of angles for another embodiment. The ordinary artisan is capable of assessing what is an acceptable engineering tolerance for a particular product, and thus is capable of assessing how to determine the variance of measurement contemplated by the term "about."

As used herein, the term "connected to" contemplates at least two meanings, unless stated otherwise. In a first meaning, "connected to" means that component A was, at least at some point, separate from component B, but then was later joined to component B in either a fixed or a removably attached arrangement. In a second meaning, "connected to" means that component A could have been integrally formed with component B. Thus, for example, a bottom of a pan is "connected to" a wall of the pan. The term "connected to" may be interpreted as the bottom and the wall being separate components that are snapped together, welded, or are otherwise fixedly or removably attached to each other. However, the bottom and the wall may be deemed "connected" when formed contiguously together as a monocoque body.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of bifold doors. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an inclusive "or" and, as such includes "and." Further, items joined by an or may include any combination of the items with any number of each item unless expressly stated otherwise.

In the above description, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description. Further, other embodiments not explicitly described above can be devised which do not depart from the scope of the one or more embodiments as disclosed herein. Accordingly, the scope of the one or more embodiments should be limited only by the attached claims.

What is claimed is:

1. A bifold door, comprising:

an upper panel comprising a top edge disposed proximate an anchor and a lower edge disposed distal of the anchor relative to the top edge;

an upper hinge connecting the anchor to the top edge of the upper panel, wherein the upper hinge is configured to permit rotation of the top edge of the upper panel but prevent elevation of the top edge of the upper panel, relative to a direction of gravity;

a first actuator connected to the anchor and to the upper panel, wherein:

the first actuator is configured to lift the lower edge of the upper panel upwardly relative to the direction of gravity and outwardly relative to the anchor, and the first actuator is further configured to effect lifting of the upper panel;

a lower panel, separated from the upper panel, the lower panel comprising an upper edge disposed proximate the lower edge of the upper panel, and a bottom edge disposed distal of the lower edge of the upper panel, wherein the top edge of the upper panel is configured, during lifting of the bifold door, to rotate in a first direction and the upper edge of the lower panel is configured to rotate in a second direction opposite the first direction; and a second actuator connected to the upper panel and to the lower panel, wherein:

the second actuator is configured to lift the upper edge of the lower panel upwardly relative to the direction of gravity and outwardly relative to the anchor, the second actuator is further configured to effect lifting of the lower panel, the first actuator and the second actuator are disposed between outer edges of the upper panel and the lower panel.

2. The bifold door of claim 1, further comprising:

a claw hinge connected to the lower edge of the upper panel and connected to the upper edge of the lower panel, wherein the second actuator is connected directly to the upper panel and is connected indirectly to the lower panel by being directly connected to the claw hinge.

3. The bifold door of claim 1, further comprising:

an anchor hinge connected to the anchor, wherein the first actuator is connected to the anchor via the anchor hinge.

4. The bifold door of claim 1, wherein the first actuator and the second actuator comprise at least one of hydraulic actuators and electric actuators.

5. The bifold door of claim 1, wherein, in a closed position, the first actuator and the second actuator are about perpendicular to each other.

6. The bifold door of claim 5, wherein, in the closed position, the upper panel and the lower panel are in about a same plane.

7. The bifold door of claim 1, wherein the second actuator comprises a positive displacement actuator.

8. The bifold door of claim 1, wherein, in an open position, the first actuator and the second actuator are in an about parallel relationship to each other.

9. The bifold door of claim 8, wherein, in the open position, the upper panel and the lower panel are in about parallel relationship to each other.

10. The bifold door of claim 9, wherein, in the open position, the first actuator and the second actuator are about parallel to the anchor.

11. The bifold door of claim 1, further comprising:

a guide roller connected to the lower panel, the guide roller configured to roll within a rail vertically disposed, relative to the direction of gravity, adjacent the bifold door.

12. The bifold door of claim 1, further comprising:

a stop connected to the lower panel and disposed between a space separating the upper panel and the lower panel.

13. The bifold door of claim 1, wherein a space is defined between the upper panel and the lower panel.

14. A method of manufacturing a bifold door, comprising:

connecting a first actuator connected to an upper panel of the bifold door, wherein the first actuator further comprises a connection point configured to connect to an anchor; and connecting a second actuator to the upper panel and to a lower panel of the bifold door, wherein:

the first actuator is configured to rotate the upper panel, the second actuator is configured to rotate the lower panel, the first actuator and the second actuator are disposed in a plane intersecting the bifold door, the first actuator and the second actuator are configured to be actuated in tandem; and the first actuator and the second actuator are disposed between outer edges of the upper panel and the lower panel.

15. The method of claim 14, further comprising:

connecting the connection point to the anchor.

16. The method of claim 14, further comprising:

connecting a guide roller connected to a side of the lower panel.

17. The method of claim 16, further comprising:

connecting a rail to a side of a building; and inserting the guide roller into the rail.

18. A method comprising:

connecting an upper panel to an anchor, the upper panel comprising a top edge disposed proximate the anchor and a lower edge disposed distal of the anchor relative to the top edge;

connecting an upper hinge to the anchor and to the top edge of the upper panel, wherein the upper hinge is configured to permit rotation of the top edge of the upper panel but prevent elevation of the top edge of the upper panel, relative to gravity;

connecting a first actuator to the anchor and to the upper panel, wherein the first actuator is configured to lift the lower edge of the upper panel upwardly relative to a direction of gravity and outwardly relative to the anchor; and connecting a second actuator to the upper panel and to an upper edge of a lower panel, wherein the second actuator is configured to rotate the lower panel, wherein the top edge of the upper panel is configured, during lifting of the bifold door, to rotate in a first direction and the upper edge of the lower panel is configured to rotate in a second direction opposite the first direction, and wherein the first actuator and the second actuator are disposed between outer edges of the upper panel and the lower panel.

19. The bifold door of claim 1, wherein the first actuator and the second actuator lie about on a common axis relative to the upper panel and the lower panel.

* * * * *